US011906396B1

(12) United States Patent
Laing, III

(10) Patent No.: US 11,906,396 B1
(45) Date of Patent: Feb. 20, 2024

(54) SYSTEM AND METHOD OF USING A MOBILE DEVICE AS AN AERODYNAMIC TESTING SYSTEM AND POWER METER

(71) Applicant: William Blake Laing, III, Ooltewah, TN (US)

(72) Inventor: William Blake Laing, III, Ooltewah, TN (US)

( * ) Notice: Subject to any disclaimer, the term of this patent is extended or adjusted under 35 U.S.C. 154(b) by 360 days.

(21) Appl. No.: 16/999,903

(22) Filed: Aug. 21, 2020

Related U.S. Application Data

(60) Provisional application No. 62/890,344, filed on Aug. 22, 2019.

(51) Int. Cl.
| | |
|---|---|
| *G01M 9/06* | (2006.01) |
| *G01M 9/08* | (2006.01) |
| *G07C 5/08* | (2006.01) |
| *G07C 5/00* | (2006.01) |
| *G01M 17/007* | (2006.01) |

(52) U.S. Cl.
CPC ............ *G01M 9/06* (2013.01); *G01M 9/08* (2013.01); *G01M 17/007* (2013.01); *G07C 5/008* (2013.01); *G07C 5/0816* (2013.01)

(58) Field of Classification Search
CPC ........ G01M 9/06; G01M 9/08; G01M 17/007; G07C 5/008; G07C 5/0816
See application file for complete search history.

(56) References Cited

U.S. PATENT DOCUMENTS

| | | | |
|---|---|---|---|
| 7,254,998 | B2 | 8/2007 | Rueger |
| 7,377,180 | B2 | 5/2008 | Cunningham |
| 8,612,165 | B2 | 12/2013 | Froncioni et al. |
| 10,699,594 | B2 * | 6/2020 | Mermel ............. A63B 71/0622 |
| 2019/0301969 | A1 * | 10/2019 | Morton ................. G01P 21/025 |

OTHER PUBLICATIONS

Martin, et al. (2006), "Aerodynamic drag area of cyclists determined with field-based measures", Sportscience 10: 68-9.
Chung "Indirect Estimation of CdA using a power meter" Jul. 14, 2007, Internet presentation (link to a modified version dated Aug. 2010) http://anonymous.coward.free.fr/wattage/cda/indirect-cda.pdf.

* cited by examiner

*Primary Examiner* — Michael V Kerrigan
(74) *Attorney, Agent, or Firm* — Meunier Carlin & Curfman

(57) ABSTRACT

Methods of determining resistive coefficients of a vehicle include using a force-based analysis method and a work-energy analysis method. The methods include receiving an input on a mobile device to initiate a test protocol along a path. The mobile device records a set of measurements for determining a drag area coefficient and a coefficient of rolling resistance for the vehicle using the force-based or work-energy analysis method. For the force-based analysis method, a direct measurement of proper acceleration of the vehicle is measured from an accelerometer on the mobile device. For the work-energy analysis method, a normal force on the vehicle is determined from a direct measurement of proper acceleration from an accelerometer on the mobile device. The mobile device determines the drag area coefficient and the coefficient of rolling resistance based on the set of measurements using the force-based or work-energy analysis method.

20 Claims, 19 Drawing Sheets

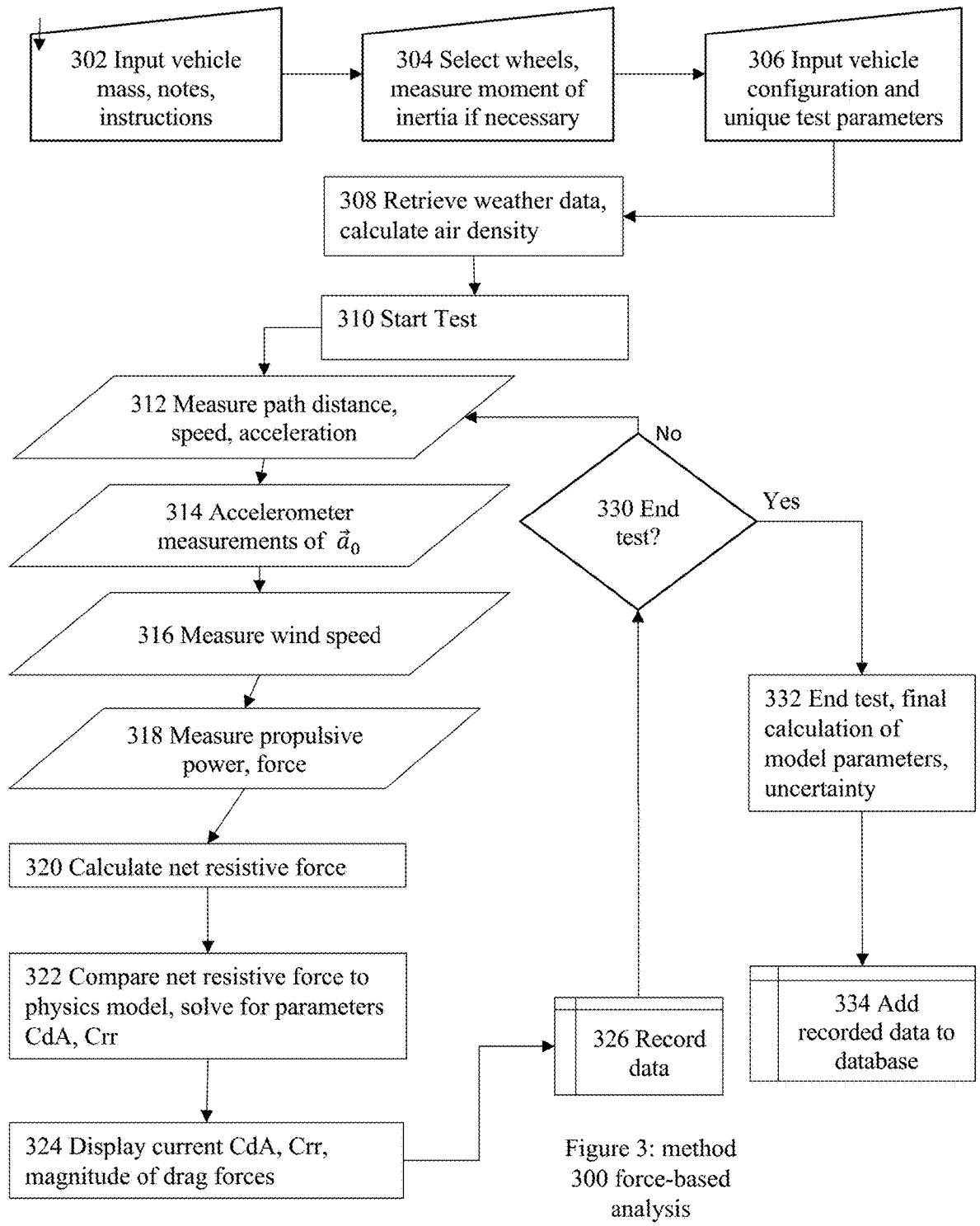
Figure 3: method 300 force-based analysis

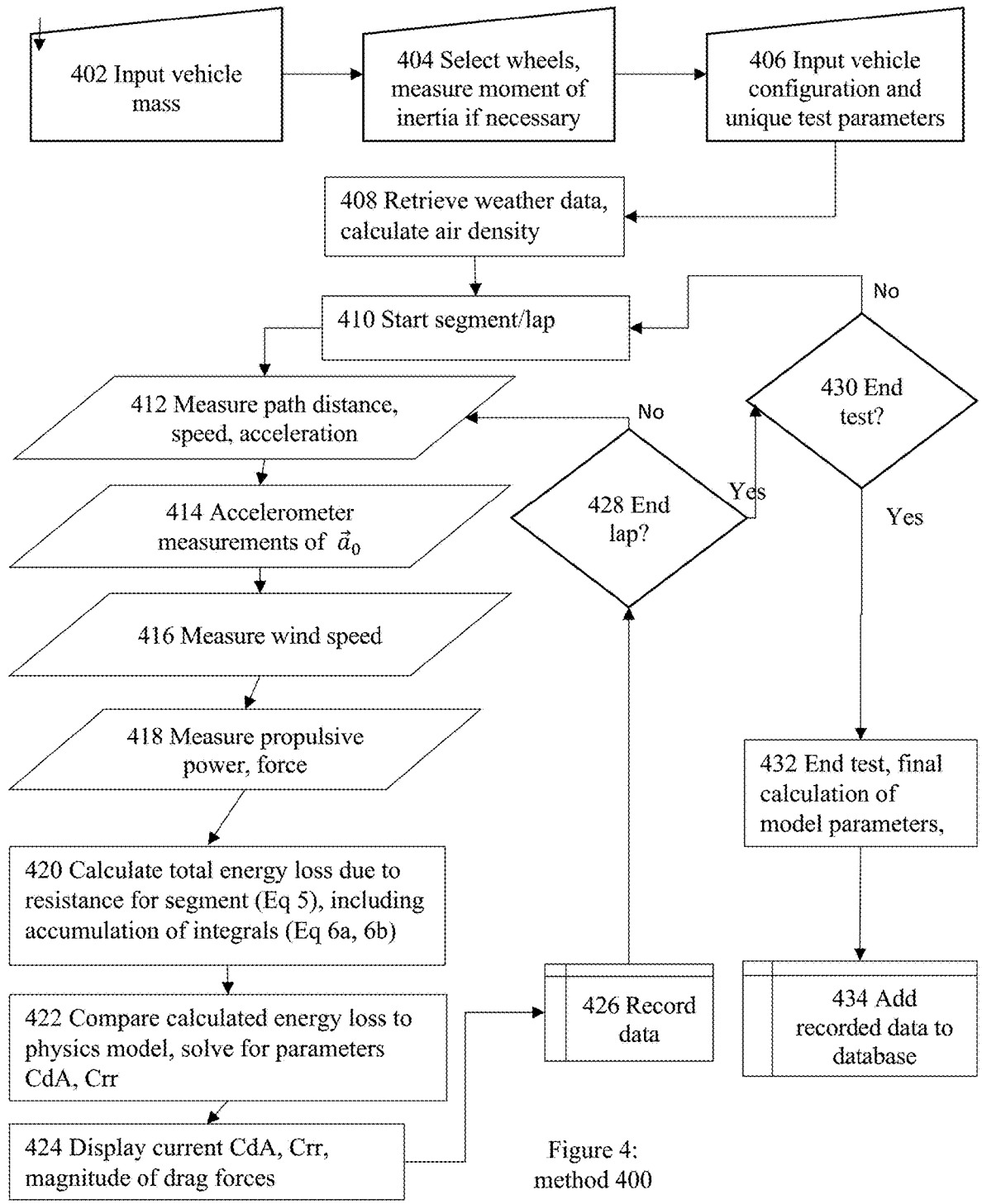
Figure 4: method 400

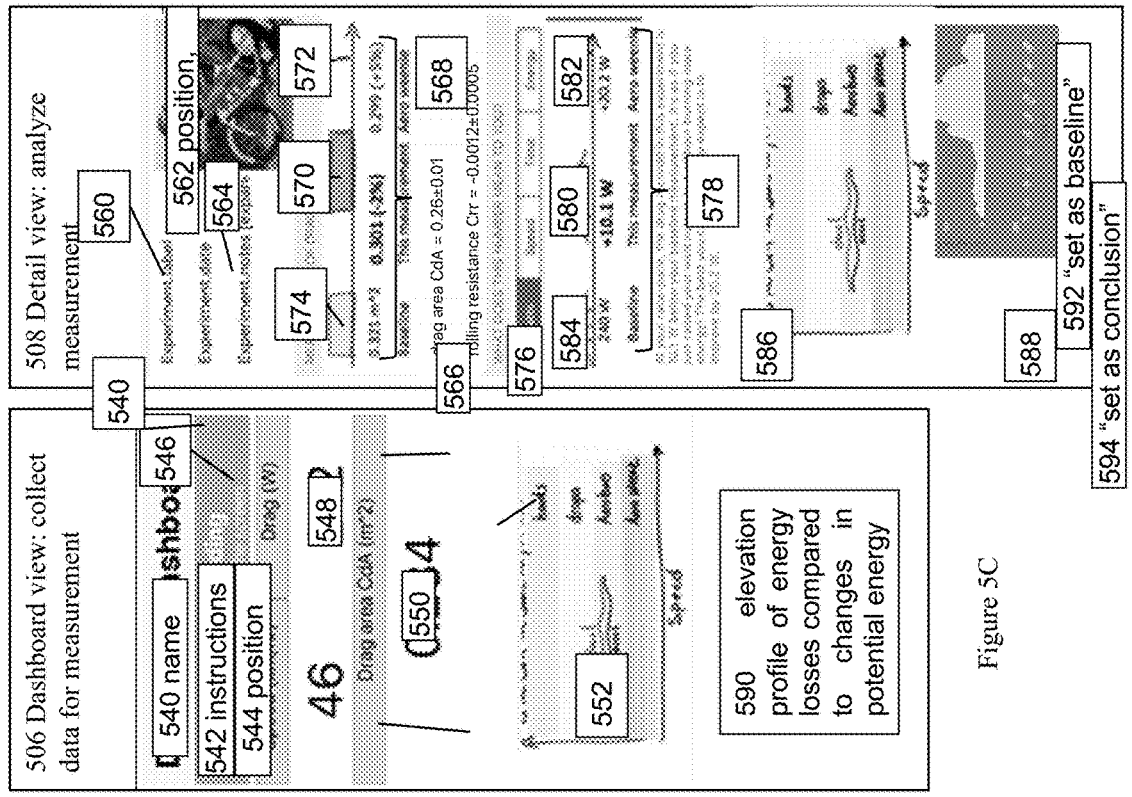
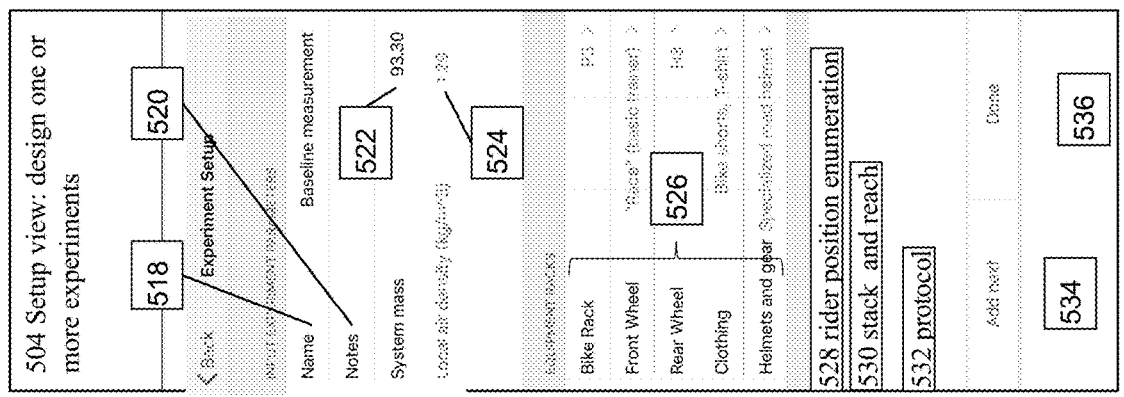
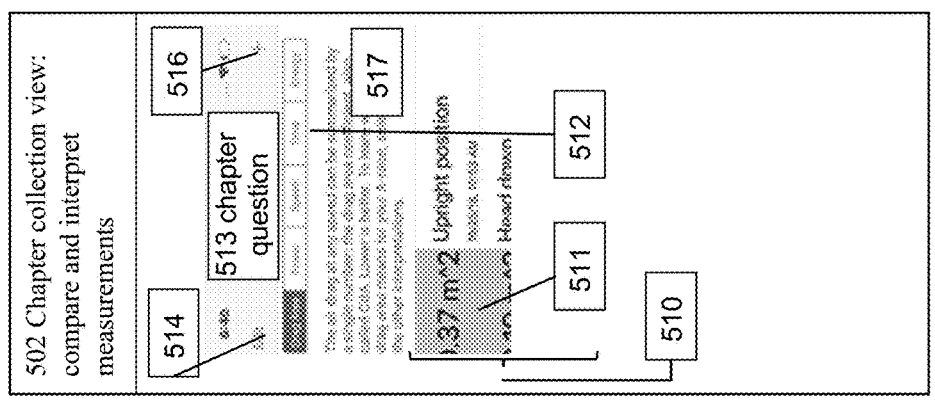
Figure 5A
Figure 5B
Figure 5C
Figure 5D

806 Experiment detail view: compare current to a baseline experiment and also to an ideal result.

804 Lab notebook chapter collection view with power selected: compare power savings between measurements

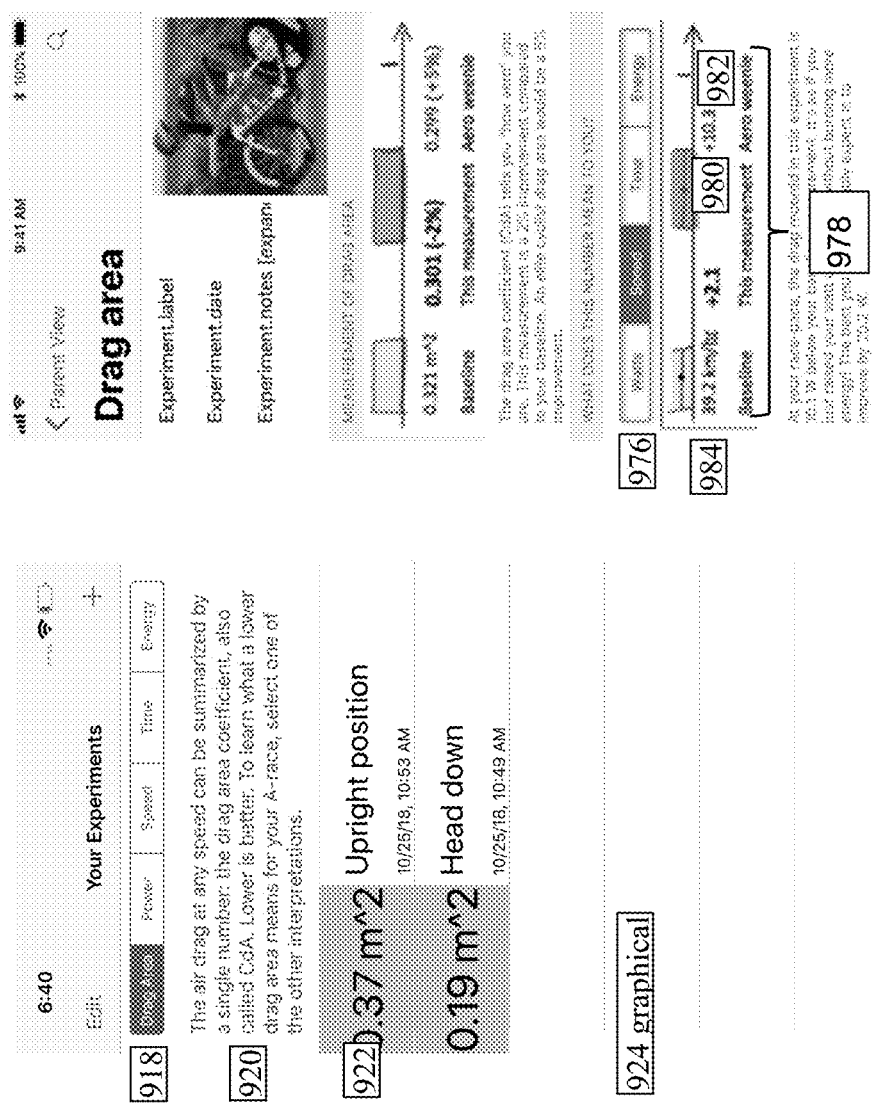
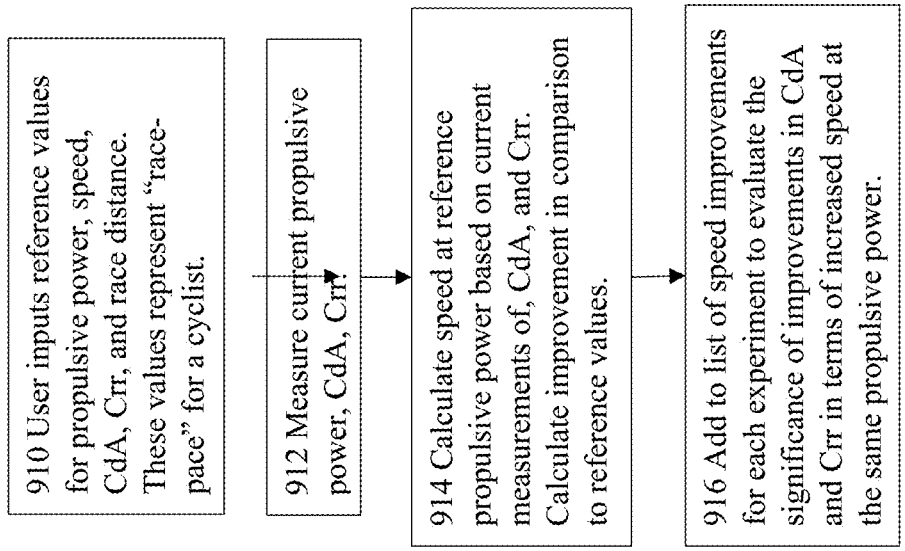
Figure 9A
Figure 9B
Figure 9C

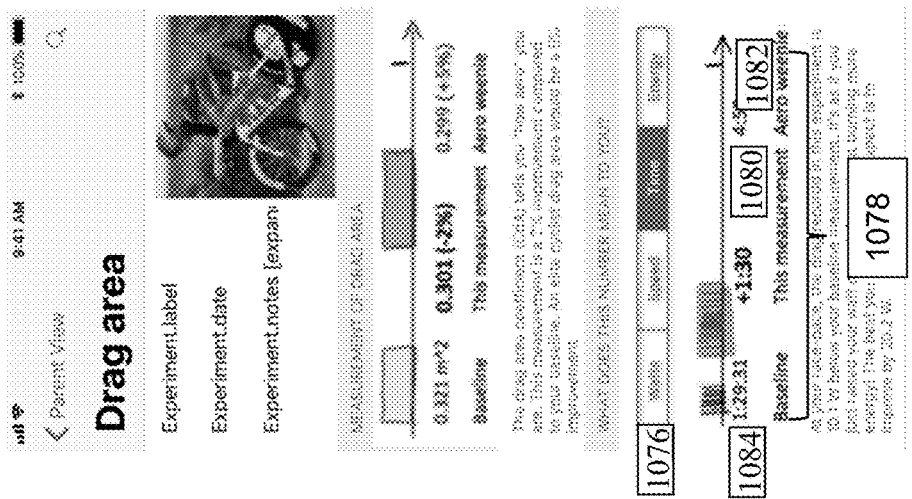

1006 Detail view: compare to baseline and best possible

Figure 10C

1004 Collection view: compare time savings between measurements

Figure 10B

1002 Analysis of time savings

1010 User inputs reference values for propulsive power, speed, CdA, Crr, and race distance. These values represent "race-pace" for a cyclist.

1012 Input or Retrieve course elevation profile, air density

1014 Calculate time to complete the course at the threshold intensity, based on current CdA and Crr. Compare to reference values to calculate time savings.

1016 Add to list of calculated time savings for each experiment to evaluate the significance of improvements in CdA and Crr in terms of improvements in race time.

Figure 10A

1202 User objectives input view

1206 Unit preference [lb, in, mph]

WHAT DOES A DRAG AREA MEAN FOR YOUR RACE?

Will a lower drag area save you milliseconds, or minutes on your A-race? Tell us more about your race so we can tell you what your drag area measurements mean in terms of what matters to you.

1208 Power (W) 250
1210 Distance (km) 180.246
1214 air density (kg/m^3) 1.20
1212 Speed (kph) 32.187

Save

Figure 12A

1204 Estimation of drag area of a vehicle

Unit preference [lb, in, mph]

COMPARE ELITE CYCLIST DRAG AREAS 1220 position

1222 Height (cm) 187.96

What would be the drag area of a typical pro with your ideal build? Enter the ideal weight you think you'd have with your body type if you turned pro. The calculation is a an estimate based on measurements of pro 1224 Mass (kg) 78.018
1226 coeffCdAModel 0.279

Figure 12B

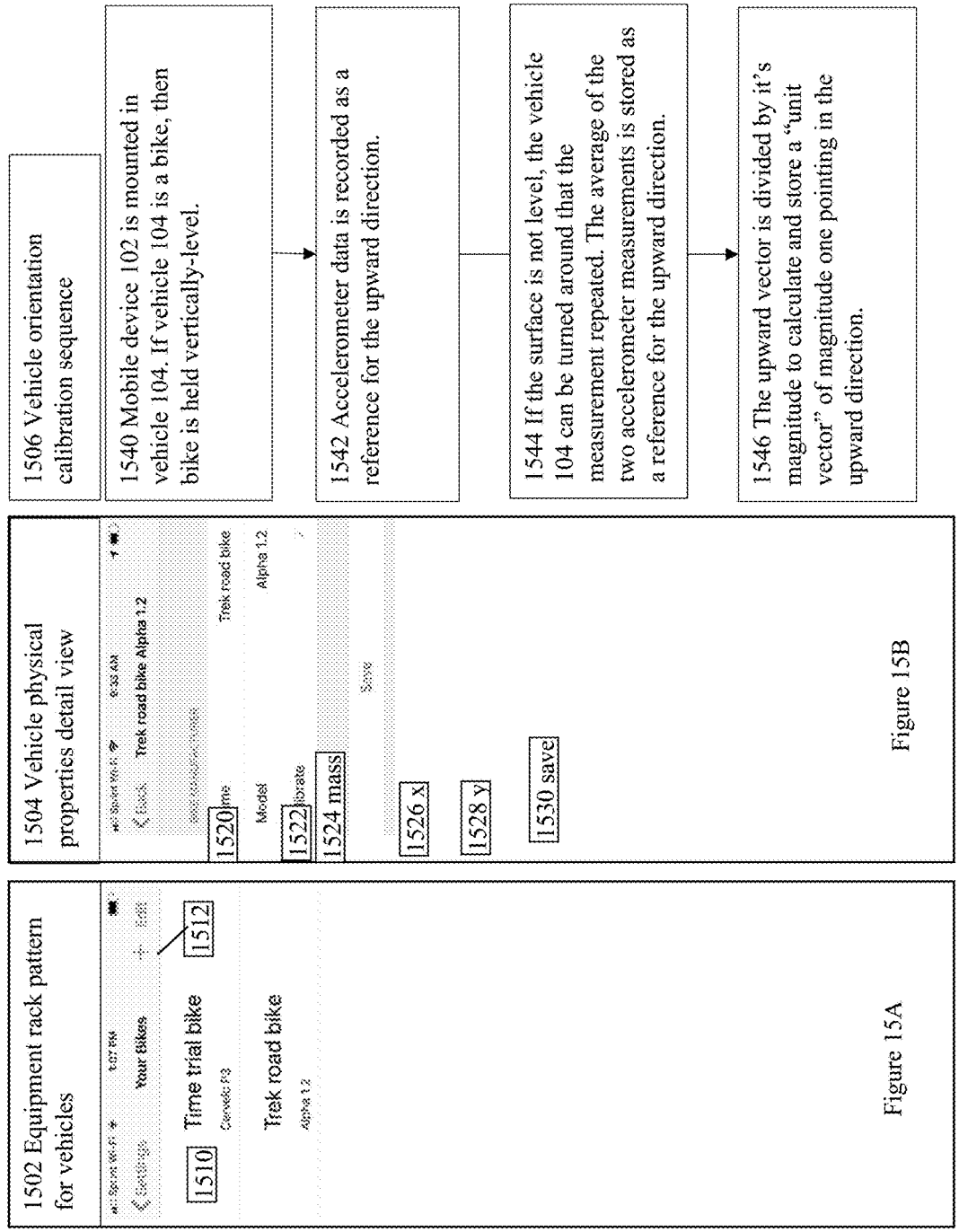

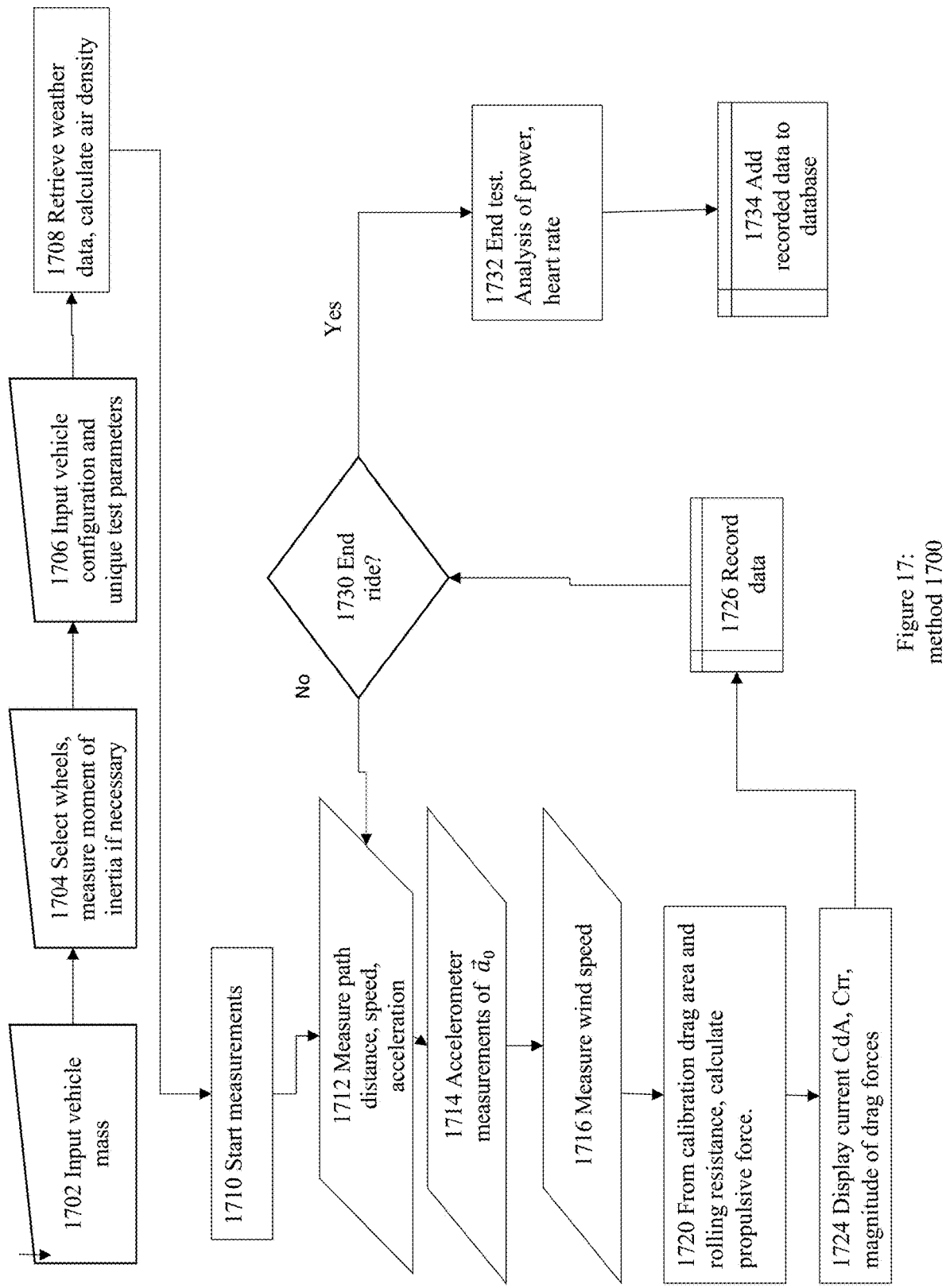
Figure 17: method 1700

SYSTEM AND METHOD OF USING A MOBILE DEVICE AS AN AERODYNAMIC TESTING SYSTEM AND POWER METER

CROSS REFERENCE TO RELATED APPLICATIONS

This application claims priority to U.S. Provisional Patent Application Ser. No. 62/890,344 filed Aug. 22, 2019, the disclosure of which is expressly incorporated herein by reference.

BACKGROUND

The amount of energy to maintain motion of a fast-moving land vehicle is primarily determined by the forces of aerodynamic drag and tire rolling resistance. The air drag force for a land vehicle traveling at a relatively high speed is modeled as $F_{air}=\rho\, CdA\, v^3$ and therefore is completely characterized by an accurate determination of the aerodynamic "drag area" coefficient denoted CdA. The tire rolling resistance is modeled as $F_{tire} \approx C_{rr} mg$. Because the power $P=F\, v$ to counteract aerodynamic drag is proportional to ("speed cubed"), the magnitude of the drag area coefficient CdA becomes the dominant factor in differentiating the performance of vehicles at high speed. In bicycle racing or motorsports, it is desired to measure aerodynamic drag area coefficient CdA and, to a lesser extent, tire rolling resistance coefficient $C_{rr}$.

The drag area coefficient CdA can be measured in a wind tunnel at significant expense. There are several well-known field testing protocols with underlying methods of analysis to determine CdA based on the analysis of forces using Newton's second law ($\vec{F}_{net}=m\vec{a}$). Force-based methods of analysis measure $m\vec{a}_{\parallel}$ where $\vec{a}_{\parallel}$ is the acceleration in the direction of motion, to solve for the sum of resistive forces $\vec{F}_{air}+\vec{F}_{tires}+\vec{F}_{other}$ as the unknown component of $\vec{F}_{net}$, as shown in FIG. 2. By measuring the sum of resistive forces at various speeds, linear regression can be used to independently determine the drag area coefficient CdA in $\vec{F}_{air}$ as well as the coefficient of rolling resistance Crr in $\vec{F}_{tires}$. An alternative to force-based methods of analysis known as the "Virtual Elevation" method (VE) uses a single- or multi-lap closed loop protocol (with known elevation change $\Delta h=0$) and the analysis method solves Newton's second law $\vec{F}_{net}=m\vec{a}$ for the road slope as an unknown and numerically integrates the slope to obtain the "virtual elevation" of the path, based on presumed values of CdA and Crr. For a closed-loop path, one expects the virtual elevation at the end of the path to match that of the beginning, which provides a check on the presumed values of CdA and Crr: the unknown CdA and Crr parameters are adjusted until the closed-loop condition is satisfied. This method has the advantage that an acceleration sensor is not necessary and therefore is not prone to challenges from accelerometer noise.

Implementation of any of the above protocols requires a way of recording relevant measurements from the accelerometer and speed sensor. If sufficient data is recorded then it must next be imported onto a personal computer to perform an analysis using either method, but even when assisted by a spreadsheet or dedicated computer software, the number of manual tasks and practical considerations prevent real-time feedback in the field. Additionally, post-processing of data is often required: accelerometer measurements and speed sensor measurements must be matched (unless a single device can log both measurements) and multiple-lap protocol data may require manual lap splits. Several similar peripheral on-vehicle hardware devices (such as the VELOCOMP AEROPOD, the GARMIN TRACK AERO, or the AEROLAB TECH) have been developed to log speed, collect sensor data, and calculate resistive forces. The user interface for these hardware devices is limited to either a very simple alpha-numeric onboard display or one or more data fields on a bicycle computer. A mobile application for a bicycle computer has the advantage of using existing hardware, but does not have the advanced graphical and processing capabilities of a mobile device for analysis of a single test, or comparison of multiple tests to show the aerodynamic advantage of certain configurations. Currently, bicycle computers cannot determine air density ρ needed for any aerodynamic testing. Most bicycle computers lack an accelerometer and therefore cannot measure force.

SUMMARY

A method of using a mobile device (e.g. mobile phone or tablet) is disclosed which enables the collection of aerodynamic measurement data with user guidance, real-time display of drag area and/or rolling resistance and instant post-analysis in the field, including a comparative analysis with interpretation in terms of savings of power, time or energy or an increase in speed. A method of use of a mobile device to measure applied power (as a "power meter" or "dynamometer") is also disclosed.

A first aspect of the disclosure provides a method of determining resistive coefficients of a vehicle using a force-based analysis method. The method comprises receiving, via a mobile application executing on a mobile device mounted to a vehicle, an input to initiate a test protocol along a path. The method comprises recording, by the mobile application, a set of measurements for determining a drag area coefficient and a coefficient of rolling resistance for the vehicle using the force-based analysis method. The set of measurements includes a direct measurement of proper acceleration of the vehicle from an accelerometer on the mobile device. The method comprises determining, by the mobile application, the drag area coefficient and the coefficient of rolling resistance based on the set of measurements using the force-based analysis method.

In some implementations of the first aspect of the disclosure, the set of measurements include a ground speed and an air speed.

In some implementations of the first aspect of the disclosure, the method further comprises obtaining, by the mobile application, a wind speed from a remote weather database. The method also comprises determining the air speed based on the wind speed and the ground speed.

In some implementations of the first aspect of the disclosure, the ground speed is measured from a speed sensor on to the vehicle and in communication with the mobile device.

In some implementations of the first aspect of the disclosure, the ground speed is determined based on a plurality of time-stamped location measurements from a global positioning system (GPS) sensor on the mobile device.

In some implementations of the first aspect of the disclosure, the test protocol is a coast-down test protocol, and wherein the set of measurements is obtained using only sensors present on the mobile device.

In some implementations of the first aspect of the disclosure, the sensors present on the mobile device include a GPS sensor and the accelerometer.

In some implementations of the first aspect of the disclosure, the set of measurements includes weather data from a remote database, wherein the remote database is accessible by the mobile device.

In some implementations of the first aspect of the disclosure, the set of measurements further include a power of propulsion of the vehicle measured from a power sensor on the vehicle and in communication with the mobile device.

In some implementations of the first aspect of the disclosure, the set of measurements is recorded on a periodic basis. The method further comprises calculating, by the mobile application, for each of the set of measurements recorded, an (x, y) value pair based on the corresponding set of measurements to produce a plurality of (x, y) value pairs. The method comprises determining, by the mobile application, a line fit for the plurality of (x, y) value pairs. The method comprises determining, by the mobile application, a slope and y-intercept of the line fit, wherein the coefficient of rolling resistance is the y-intercept of the line fit and the drag area coefficient is determined based on the slope.

In some implementations of the first aspect of the disclosure, the (x, y) value pair is calculated by:

$$y = \frac{\left(\frac{P_{propel}}{v_g} + ma_{0,\|} - \frac{I}{R^2}a_{\|}\right)}{ma_{0,\perp}} \text{ and } x = v_{air}^2 / a_{0,\perp},$$

where $P_{propel}$ is the power of propulsion of the vehicle, $v_g$ is the ground speed, m is a mass of the vehicle, $a_{0,\|}$ is a component of the proper acceleration in a direction parallel to a surface upon which the vehicle travels, $a_{0,\perp}$ is a component of the proper acceleration in a direction perpendicular to the surface upon which the vehicle travels, I is a net moment of inertia of tires on the vehicle, R is an average radius of the tires on the vehicle, and $v_{air}$ is the air speed.

In some implementations of the first aspect of the disclosure, the line fit is determined by one of the group of statistical analysis methods consisting of: linear regression, multilinear regression, multivariable regression, Bayesian inference, or Kalman filtering.

In some implementations of the first aspect of the disclosure, the method further comprises removing measurements in the set of measurements for segments of the path during which brakes were applied on the vehicle.

In some implementations of the first aspect of the disclosure, the force-based analysis method comprises:

$$\frac{1}{2}\rho CdAv_{air}^2 + C_{rr}a_{0,\perp} = F_{resist} = \frac{P_{propel}}{v_g} + ma_{0,\|} - \frac{I}{R^2}a_{\|},$$

where ρ is air density, CdA is the drag area coefficient, $C_{rr}$ is the coefficient of rolling resistance, $v_{air}$ is an air speed relative to the vehicle, $a_{0,\perp}$ is a component of the proper acceleration in a direction perpendicular to a surface upon which the vehicle travels, $P_{propel}$ is a power of propulsion of the vehicle, $v_g$ is a ground speed of the vehicle, m is a mass of the vehicle, $a_{0,\|}$ is a component of the proper acceleration in a direction parallel to the surface upon which the vehicle travels, I is a net moment of inertia of tires on the vehicle, and R is an average radius of the tires on the vehicle.

In some implementations of the first aspect of the disclosure, the method further comprises calculating, by the mobile application, a power of propulsion of the vehicle using the drag area coefficient and the coefficient of rolling resistance. The method further comprises displaying, by the mobile application, the power of propulsion on a user interface of the mobile device.

In some implementations of the first aspect of the disclosure, the method further comprises calculating, by the mobile application, the drag area coefficient for each of multiple rider positions on the vehicle. The method further comprises determining, by the mobile application, a current rider position on the vehicle based on the calculated power of propulsion.

A second aspect of the disclosure provides a method of determining resistive coefficients of a vehicle using a work-energy analysis method. The method comprises receiving, via a mobile application executing on a mobile device mounted to a vehicle, an input to initiate a test protocol along a path. The method comprises recording, by the mobile application, a set of measurements for determining a drag area coefficient and a coefficient of rolling resistance for the vehicle using the work-energy analysis method. A normal force on the vehicle is determined from a direct measurement of proper acceleration from an accelerometer on the mobile device. The method comprises determining, by the mobile application, the drag area coefficient and the coefficient of rolling resistance based on the set of measurements using the work-energy analysis method.

In some implementations of the second aspect of the disclosure, the set of measurements include the proper acceleration, a ground speed, an air speed, and a height of the vehicle.

In some implementations of the second aspect of the disclosure, the method further comprises obtaining, by the mobile application, a wind speed from a remote weather database. The method further comprises determining the air speed based on the wind speed and the ground speed.

In some implementations of the second aspect of the disclosure, the ground speed is measured from a speed sensor on to the vehicle and in communication with the mobile device.

In some implementations of the second aspect of the disclosure, the ground speed is determined based on a plurality of time-stamped location measurements from a global positioning system (GPS) sensor on the mobile device.

In some implementations of the second aspect of the disclosure, the set of measurements further include a power of propulsion of the vehicle measured from a power sensor on the vehicle and in communication with the mobile device.

In some implementations of the second aspect of the disclosure, the set of measurements is recorded on a periodic basis. The method further comprises calculating, by the mobile application, for each of the set of measurements recorded, an (x, y) value pair based on the corresponding set of measurements to produce a plurality of (x, y) value pairs. The method comprises determining, by the mobile application, a line fit for the plurality of (x, y) value pairs. The method comprises determining, by the mobile application, a slope and y-intercept of the line fit, wherein the coefficient of rolling resistance is the y-intercept of the line fit and the drag area coefficient is determined based on the slope.

In some implementations of the second aspect of the disclosure, the (x, y) value pair is calculated by:

$$y = \left(W_{pedaling} - \frac{1}{2}\left(m + \frac{I}{R^2}\right)(v_f^2 - v_i^2) - mg(h_f - h_i) - W_{other}\right) / (mI_t) \text{ and } x = \frac{I_a}{I_t}, \text{ where}$$

$$I_a = \int_{t_i}^{t_f} v_{air}^2 v dt = \int_{s_i}^{s_f} \bar{v}_{air}^2 ds,$$

$$I_t = \int_{t_i}^{t_f} a_{0\perp} \bar{v} dt = \int_{s_i}^{s_f} a_{0\perp} ds, \text{ and } W_{pedaling} = \int P_{propel} dt,$$

where $P_{propel}$ is the power of propulsion of the vehicle, $v_{air}$ is the air speed, $a_{0,\perp}$ is a component of the proper acceleration in a direction perpendicular to the surface upon which the vehicle travels, $v_i$ is the ground speed upon initiation of a test protocol segment, $v_f$ is the ground speed upon conclusion of the test protocol segment, m is a mass of the vehicle, $h_i$ is the height upon initiation of the test protocol segment, $h_f$ is the height upon conclusion of the test protocol segment, I is a net moment of inertia of tires on the vehicle, R is an average radius of the tires on the vehicle, and $W_{other}$ is work done by other forces on the vehicle.

In some implementations of the second aspect of the disclosure, $W_{other}$ is set to zero when brakes are not used during the test protocol segment.

In some implementations of the second aspect of the disclosure, is work done by drivetrain frictional losses and/or frictional torque.

In some implementations of the second aspect of the disclosure, the line fit is determined by one of the group of statistical analysis methods consisting of: linear regression, multilinear regression, multivariable regression, Bayesian inference, or Kalman filtering.

In some implementations of the second aspect of the disclosure, the work-energy analysis method comprises:

$$\frac{1}{2}\rho CdA \; I_a + Crr \; mI_t + W_{other} =$$

$$W_{pedaling} - \frac{1}{2}(m + I/R^2)(v_f^2 - v_i^2) - mg(h_f - h_i),$$

where $$I_a = \int_{t_i}^{t_f} v_{air}^2 v dt = \int_{s_i}^{s_f} \bar{v}_{air}^2 ds,$$

$$I_t = \int_{t_i}^{t_f} a_{0\perp} \bar{v} dt = \int_{s_i}^{s_f} a_{0\perp} ds, \text{ and } W_{pedaling} = \int P_{proper} dt,$$

where $\rho$ is air density, CdA is the drag area coefficient, $C_{rr}$ is the coefficient of rolling resistance, where $P_{propel}$ is the power of propulsion of the vehicle, $v_{air}$ is the air speed, $a_{0,\perp}$ is a component of the proper acceleration in a direction perpendicular to the surface upon which the vehicle travels, $v_i$ is the ground speed upon initiation of a test protocol segment, $v_f$ is the ground speed upon conclusion of the test protocol segment, m is a mass of the vehicle, $h_i$ is the height upon initiation of the test protocol segment, $h_f$ is the height upon conclusion of the test protocol segment, I is a net moment of inertia of tires on the vehicle, R is an average radius of the tires on the vehicle, and $W_{other}$ is work done by other forces on the vehicle.

In some implementations of the second aspect of the disclosure, the method further comprises calculating, by the mobile application, a power of propulsion of the vehicle using the drag area coefficient and the coefficient of rolling resistance. The method further comprises displaying, by the mobile application, the power of propulsion on a user interface of the mobile device.

In some implementations of the second aspect of the disclosure, the method further comprises calculating, by the mobile application, the drag area coefficient for each of multiple rider positions on the vehicle. The method further comprises determining, by the mobile application, a current rider position on the vehicle based on the calculated power of propulsion.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flowchart of a method of using a mobile application to determine aerodynamic drag for a vehicle using a force-based analysis of accelerometer sensor data, for travel under a known propulsive power, such as coasting without power.

FIG. 4 is a flowchart of a method of using a mobile application to determine aerodynamic drag for a vehicle using a work-energy analysis of elevation data as well as sensor data.

FIGS. 5A-5D are exemplary mobile application 108 user interface screens of a "lab notebook chapter" pattern, which summarize and compare each one of many experimental measurements of drag area CdA.

FIG. 9A is a flowchart of how an experiment is interpreted as a gain in speed compared to a "baseline" reference value.

FIGS. 9B-9C are exemplary user interface screens are exemplary user interface screens illustrating this interpretation and comparison.

FIG. 10A is a flowchart of how an experiment is interpreted as a time savings for a given speed and course of travel compared to a "baseline" reference value and FIGS. 10B-10C are exemplary user interface screens illustrating this interpretation and comparison.

FIG. 12A is an exemplary a user interface screen which collects input parameters for "baseline" reference power, distance, and speed.

FIG. 12B is an exemplary user interface screen which collects inputs to estimate the drag area for the vehicle.

FIG. 15A-15B are exemplary user interface screens for the vehicle equipment rack, with stored properties.

FIG. 15C is a flowchart of the measurement of the orientation calibration.

FIG. 17 is a flowchart of a method of using a mobile application as a power meter.

DETAILED DESCRIPTION

Figure 1:
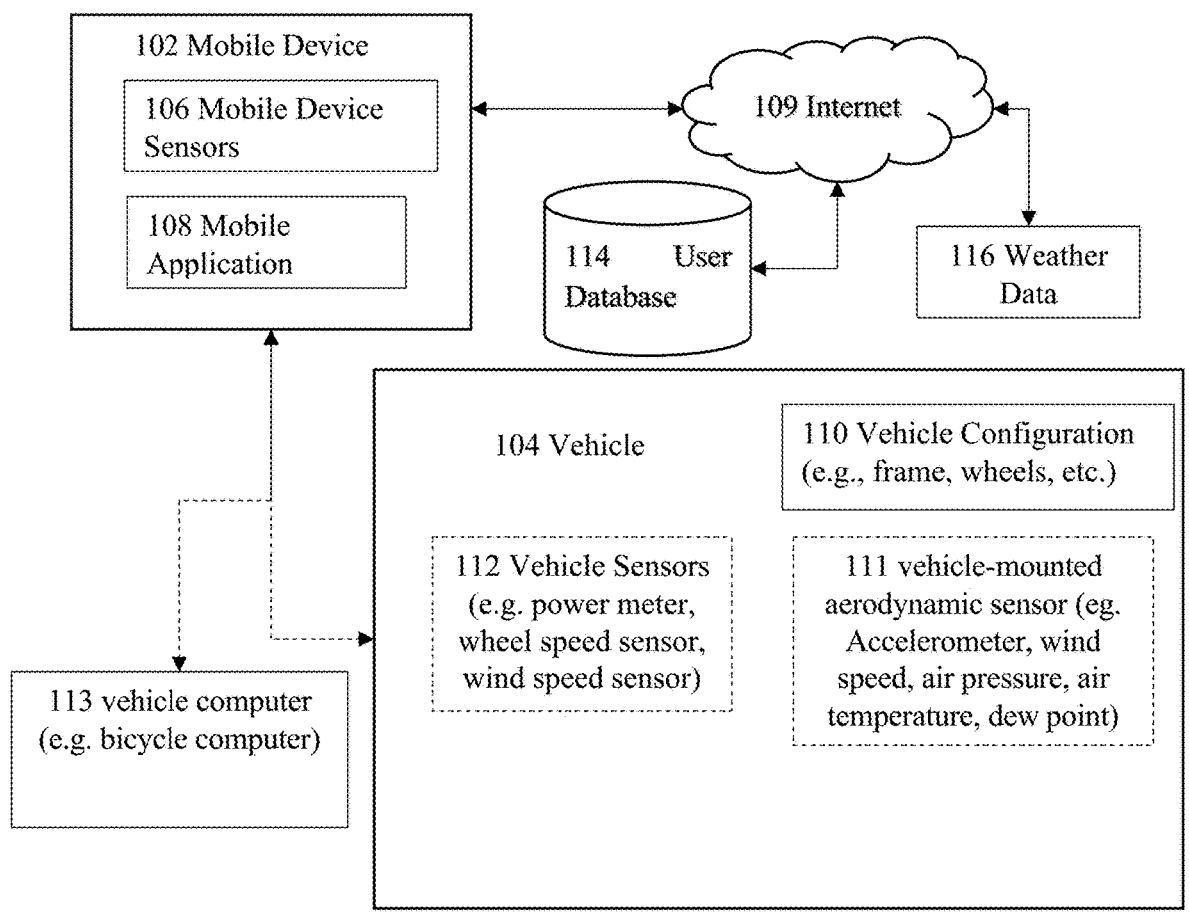
FIG. 1 illustrates an exemplary system for determining resistive coefficients of a vehicle suitable for implementing the several embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

The present disclosure provides a modified force-based analysis method as well as a novel work-energy analysis method for calculating and interpreting resistive coefficients (CdA and Crr, and more) with a mobile device (e.g. phone or tablet), either by using the on-board sensors of the mobile device alone (accelerometer/gyroscope, GPS, pressure, microphone) or in combination with one or more external sensors (cycling speed and cadence sensor, cycling power meter, pressure sensor, accelerometer/gyroscope) in communication with the mobile device. In addition, a mobile application may communicate with a dedicated aerodynamic testing hardware device, enhancing the collection of data and performance of a comparative analysis. The disclosed analysis methods calculate resistive coefficients without the need to determine grade angle or to assume the value of the normal force. Also disclosed is a method of using a mobile device (e.g., mobile phone, tablet, vehicle computer, etc.) as a vehicle power meter/vehicle dynamometer. A user interface is disclosed which allows for instant results, simple comparative analysis of multiple measurements, as well as an interpretation of calculated resistive coefficients in terms of improvements in speed, power, elapsed time, or energy expense, including statistical uncertainty to assess significance. A "coaching" interface is disclosed which allows a cycling coach to remotely monitor the aerodynamic field testing of an athlete, as well as to prescribe tests. A metric is disclosed to summarize cyclist power data, drag coefficients, and heart rate in terms of a single number for comparison: the threshold speed.

Various test protocols are disclosed in which the analysis methods are used to determine resistive coefficients using linear regression, multilinear regression, or Bayesian inference/Kalman filtering. "Test protocol" means a particular choice of test plan or test procedure, which is designed to measure parameters of a moving vehicle to perform a chosen analysis method, as described below. For example, the test protocols may include a coast-down protocol, a closed-loop protocol, an out-and-back protocol, or an open path protocol with a measured elevation profile for each of a plurality of segments of the open-loop path. In the "coast-down" protocol, the vehicle attains high speed and measurements are taken as the vehicle slows down. The vehicle attains the high speed either before starting the test or by rolling down a hill. In either case, the power $P_{propel}$ is known to be zero and need not be measured. In the "closed-loop" protocol, the vehicle completes one or more laps of a closed loop while measuring power $P_{propel}$: the elevation change for each lap is known to be zero and need not be measured. In the "out-and-back" protocol, the vehicle travels along a path segment while measuring power $P_{propel}$ during the first part of the test, then turns around and travels the other way, which can be useful to correct for wind. In the "open path" protocol, the vehicle travels measuring power $P_{propel}$ along any path. In some implementations, the open path can be divided into segments with measurable changes in elevation $\Delta h$. In any of these test protocols, an analysis method can be performed if brakes are not applied.

Details: Force-Based Analysis Method

The resistive coefficients CdA and Crr may be determined by accelerometer measurement in a force-based dynamical analysis. The force of aerodynamic drag is modeled as $$F_{air} = \frac{1}{2}\rho CdAv^2,$$

where $\rho$ is the density of air, A is the cross sectional area of the vehicle, Cd is a dimensionless quantity which depends on the shape of the vehicle, and v is the speed of the air relative to the vehicle. In practice, the product CdA can be regarded as a single factor: the effective cross-sectional area of the vehicle, or "drag area". The force of rolling resistance is modeled as $F_{tires}=C_{rr}N$, where N is the normal force and $C_{rr}$ is the coefficient of rolling resistance, a dimensionless factor that depends on the properties of the tires.

Figure 2:
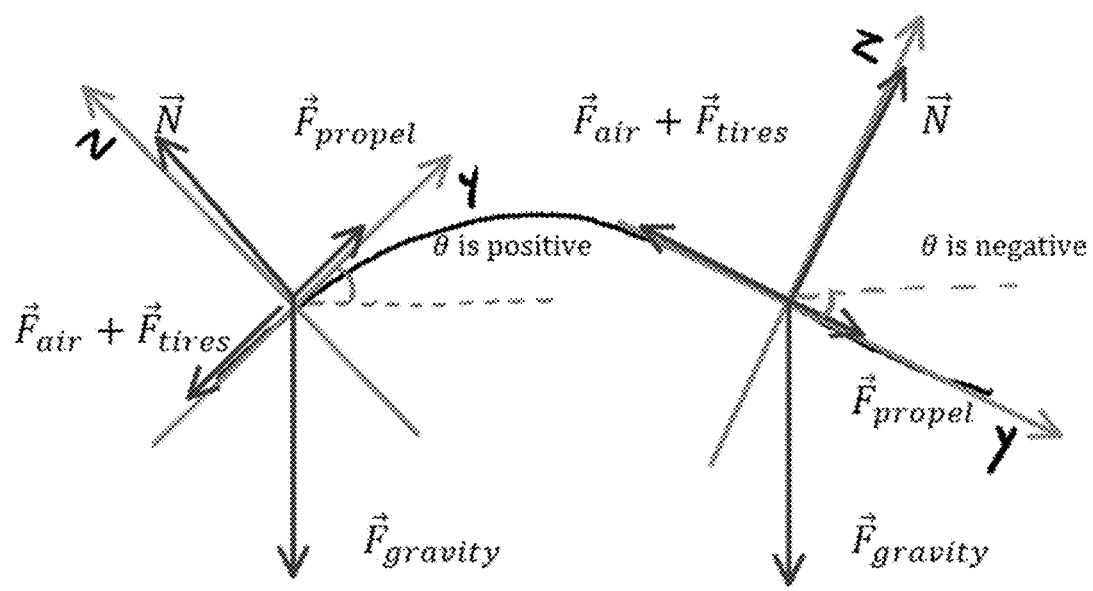
FIG. 2 is a free-body diagram representation of the forces on a vehicle traveling up a positive grade and down a negative grade.

Force-based field analysis methods known in the art are based on an application of Newton's second law $\vec{F}_{net}=m\vec{a}$, which relates the sum of forces on a body and the acceleration of that body. FIG. 2 shows the net force $\vec{F}_{net} = \vec{F}_{propel} + \vec{F}_{resist} + \vec{F}_{gravity} + \vec{N}$, where $\vec{F}_{propel}$ is the propulsive force of the vehicle, coming from pedaling effort or a motor, $\vec{N}$ is the normal force, and $\vec{F}_{gravity}$ is the force of gravity. Newton's second law in the direction perpendicular to the grade can be used to determine the normal force N:

$$N = ma_\perp + mg\cos\theta, \qquad \text{EQ. 1}$$

where $a_\perp$ is the component of acceleration perpendicular to the surface and the angle $\theta$ is the grade of the road surface.

FIG. 2 shows the forces exerted on a vehicle treated as a point particle, but a physical vehicle is an extended system with rotating wheels subject to a force on the tires by the road surface $\vec{F}_{react}$, which is a Newton's-third law reaction to the force of the tire on the road. In order to include the effect of the inertial reaction of the wheels to vehicle acceleration ("spinning up"/"spinning down"), this reaction force $$F_{react} = \frac{I}{R^2} a_\parallel,$$

may be added to the point-particle approximation, where $a_\parallel$ is the acceleration in the direction of motion and I is the net moment of inertia of the tires. The effective net force of rolling resistance $C_{rr}N$ on the deformable vehicle tires can also be included in the point-particle approximation, obtaining Newton's second law applied to the direction of motion:

$$-F_{resist} + F_{propel} - mg\sin\theta = (m + I/R^2)a_\parallel, \qquad \text{EQ. 2}$$
$$\frac{1}{2}\rho C dA v_{air}^2 + C_{rr}N = F_{propel} - mg\sin\theta + ma_\parallel - I/R^2 a_\parallel,$$

where $a_\parallel$ is understood to be the acceleration in the instantaneous direction of the motion. Using the relationship $P = \vec{F} \cdot \vec{v}$, the propulsive force $F_{propel}$ can be calculated from measured vehicular power $P_{propel}$ as $F_{propel} = P_{propel}/v_g$, where a distinction is made between the measured relative air speed $v_{air}$ and the vehicle along the ground $v_g$ to account for the possibility of wind $\vec{v}_{wind} = \vec{v}_g - \vec{v}_{air}$.

Details: Measuring Resistive Forces Without Measuring Grade Angle

The measurement of grade angle $\theta$ by accelerometer measurements is made complicated by the fact the accelerometer sensors are moving under acceleration. This disclosure circumvents the need to measure the grade angle by writing Newton's second law in the free-fall reference frame, in which the "proper acceleration" $\vec{a}_0$ would be zero if the vehicle really was in free-fall. In fact, the proper acceleration $\vec{a}_0$ is what the accelerometer directly measures. The acceleration in the reference frame of the earth $\vec{a}$ is related to $\vec{a}_0$ by $\vec{a}_0 = \vec{a} - \vec{g}$, where $\vec{g}$ is the free acceleration due to gravity in the downward direction. The normal force in EQ. 1 is directly determined from the components of the accelerometer measurement of $\vec{a}_0$ perpendicular to the surface according to $N = m(a_\perp - g_\perp) = ma_{0,\perp}$. The forward direction (e.g., direction parallel to a surface upon which the vehicle travels) and upward directions (e.g., direction perpendicular to the surface upon which the vehicle travels) are specified by the unit vectors $\hat{u}_\parallel$ and $\hat{u}_\perp$, respectively, which are determined during a calibration of phone orientation on the vehicle, described in more detail below with reference to FIG. 15C. The component of proper acceleration in the forward direction $\vec{a}_{0,\parallel}$, is determined from the dot product $\vec{a}_{0,\parallel} = \vec{a}_0 \cdot \hat{u}_\parallel$ and the component of the proper acceleration in the upward direction $\vec{a}_{0,\perp}$ is determined from the dot product $\vec{a}_{0,\perp} = \vec{a}_0 \cdot \hat{u}_\perp$.

Since the normal force can be determined directly from accelerometer measurement without knowledge of the grade angle, the net resistive force $F_{resist}$ in EQ. 2 can be calculated directly from accelerometer measurements $\vec{a}_0$, air speed $v_{air}$, ground speed $v_g$, and power measurements $P_{propel}$ in the following force-based analysis method:

$$\frac{1}{2}\rho C dA v_{air}^2 + C_{rr}a_{0,\perp} = F_{resist} = \frac{P_{propel}}{v_g} + ma_{0,\parallel} - \frac{I}{R^2}a_\parallel \qquad \text{EQ. 3a}$$

EQ. 3a demonstrates that the grade angle is not needed to calculate resistive forces. In some implementations, the reaction force may be ignored by not including the term $$-\frac{I}{R^2}a_\parallel$$

in EQ. 3a. Accordingly, EQ. 3a simplifies the determination of resistive forces through the use of direct measurements from an accelerometer on the mobile device 102. Equation 3a can be written in the form y=m'x+b, as follows:

$$\frac{F_{resist}}{ma_{0,\perp}} = \frac{1}{2}\rho C dA / m(v_{air}^2/a_{0,\perp}) + C_{rr}, \qquad \text{EQ. 3b}$$

where $$x = v_{air}^2/a_{0,\perp}, \quad y = \frac{\frac{P_{propel}}{v_g} + ma_{0,\parallel} - \frac{I}{R^2}a_\parallel}{ma_{0,\perp}}$$

as shown in the left hand side of EQ. 3b, slope $$m' = \frac{1}{2}\rho C dA/m,$$

and y-intercept $b = C_{rr}$. For each set of measurements taken or received by the mobile device 102, an (x, y) value pair is calculated. A set of multiple such (x, y) value pairs may be calculated over the course of a given test protocol. Upon completion of a respective test protocol, the set of (x, y) value pairs for a test are used in a statistical analysis of the collected data (e.g., linear regression, multilinear regression, or Bayesian inference/Kalman filtering) to determine the slope and y-intercept of a line fit to the statistically analyzed data, thereby determining values for ½ρ CdA/m and $C_{rr}$, respectively. For clarity, m' designates the slope of the line fit, whereas m designates a vehicle system mass (i.e., including a mass of the vehicle as well as the rider and equipment). Upon determining the slope, the mobile device 102 may solve for CdA upon determining the air density $\rho$, such as via a lookup operation to the weather data 116. Namely, $$CdA = \frac{2m'm}{\rho}.$$

In implementations where the reaction force is ignored, the resistive forces may still be determined, though with less precision than using EQ. 3b. Ignoring the term $$-\frac{I}{R^2}a_{\parallel},$$

EQ. 3a can be written in the form y=m'x+b, as follows:

$$\frac{P_{propel}}{v_g a_{0,\perp}} + m\frac{a_{0,\parallel}}{a_{0,\perp}} = \frac{1}{2}\rho CdA(v_{air}^2/a_{0,\perp}) + C_{rr}, \quad \text{EQ. 3b'}$$

where $x = v_{air}^2/a_{0,\perp}$, $$y = \frac{P_{propel}}{v_g a_{0,\perp}} + m\frac{a_{0,\parallel}}{a_{0,\perp}}, \text{ slope } m' = \frac{1}{2}\rho CdA,$$

and y-intercept $b = C_{rr}$. The values of CdA and $C_{rr}$ may be solved for as described above. Therefore, the resistive forces may be determined even when the vehicle wheel moments of inertia and vehicle wheel radius are unknown. Equivalently, EQ. 3b may be used with I=0 when the vehicle wheel moments of inertia and vehicle wheel radius are unknown.

In use, during appropriate ones of the test protocols described above, the mobile device 102 measures $P_{propel}$ from an external power sensor (e.g., vehicle sensor 112) in communication with the mobile device 102. The mobile device 102 measures air speed $v_{air}$ from either an external air speed sensor (e.g., vehicle sensor 112) in communication with the mobile application 108 or from a lookup operation of wind speed from the weather data 116 with ground speed. The mobile device 102 measures ground speed via measurements from a GPS sensor (e.g., sensors 106) on the mobile device 102 or an external vehicle speed sensor (e.g., vehicle sensor 112). Likewise, the mobile device 102 measures the proper acceleration from an accelerometer (e.g., sensors 106) on the mobile device 102. The remaining parameters may be configured values that are input on the mobile device 102 via the mobile application 108 as described below.

The force-based analysis method of EQs. 3a-3b can be used with any of the test protocols described above without measuring the grade angle θ. In the coast-down protocol, the power $P_{propel}$ is equal to zero. Accordingly, the term $$\frac{P_{propel}}{v_g a_{0,\perp}}$$

can be ignored in EQ. 3b and values may be measured for proper acceleration, air speed (which may be determined based on the ground speed measured by GPS and wind speed read from the weather data 116), and air density to determine $C_{rr}$ and CdA. Using the coast-down protocol with the force-based analysis method of EQs. 3a and 3b, $C_{rr}$ and CdA may be determined using only measurements from sensors already present on the mobile device 106 and readily available weather data from weather data 116. For example, when the mobile device 106 is a mobile telephone, a user may be able to determine the resistive forces using only their mobile telephone. If the vehicle is equipped with a sensor to measure power $P_{propel}$, then the force-based analysis method of EQs. 3a-3b can be used to conduct an aerodynamic field test for any path segment during which the brakes are not applied: any general path of vehicle travel may be analyzed to remove segments during which the brakes were pressed and the remaining segments analyzed using EQ. 3b. For example, with a sensor to measure power $P_{propel}$, the closed-loop, out-and-back, and open path test protocols may be used with the force-based analysis method of EQ. 3b.

Details: Improved Energy Based Method

An analysis method based on the work-energy relationship $\Delta K + \Delta U = W_{propel} + W_{resist}$ is disclosed, by which the measurement of total elevation change $\Delta h$ (and therefore potential energy change $\Delta U$) is used along with measurements of kinetic energy K and $W_{propel}$ to calculate the net work $W_{resist}$ over a path segment. If brakes are not pressed, then resistive coefficients CdA and Crr are calculated with statistical significance (standard error, goodness of fit, etc.). Any method (such as the VE method) which does not make use of accelerometer data must assume a constant normal force N=mg cos θ when determining the force of rolling resistance force Crr N (and therefore a constant force of tire rolling resistance), but in the present method, the normal force is directly measured by the accelerometer as $ma_{0,\perp}$. In some implementations, this method may be used in a mode where brakes are pressed to compare the energy losses due to brakes, tire resistance, and air resistance.

By performing a work-energy analysis of the vehicle system of mass m over a short path length segment $\Delta s$ and brief time $\Delta t$, during which there is a change in elevation $\Delta h$ and a change in speed-squared $\Delta(v^2)$, we obtain the following expression of the work-energy theorem for a wheeled vehicle:

$$\left(\frac{1}{2}\rho CdAv_{air}^2 + Crr\ ma_{0\perp} + F_{other}\right)\Delta s = \qquad \text{Eq. 4a}$$
$$P_{propel}\Delta t - \frac{1}{2}\left(m + \frac{I}{R^2}\right)\Delta(v^2) - mg\Delta h,$$

where the left side of EQ. 4a expresses the energy lost to dissipative forces $F_{air} + F_{tires}$, as well as any additional dissipative force $F_{other}$. The first term on the right expresses the net work performed by the propulsive power $P_{propel}\Delta t$. The second term on the right expresses the decrease in kinetic energy: translational kinetic energy $$\frac{1}{2}mv^2$$

plus rotational kinetic energy $$\frac{1}{2}I\left(\frac{v}{R}\right)^2,$$

where I is the sum of vehicle wheel moments of inertia and R is the vehicle wheel radius. The third term on the right expresses the decrease in gravitational potential energy mgh.

EQ. 4a can be divided by $\Delta t$ to obtain the equivalent expression $$\left(\frac{1}{2}\rho CdA \bar{v}_{air}^2 + Crr\, m a_{0\perp} + F_{other}\right)\frac{\Delta s}{\Delta t} = \qquad \text{EQ. 4b}$$
$$-\frac{1}{2}(m + I/R^2) 2\bar{a}_{\parallel}\frac{\Delta s}{\Delta t} - mg\frac{\Delta h}{\Delta t} + P_{propel},$$

where $\bar{a}$ is the average acceleration for the interval. Integrating either of these expressions over a longer path (consisting of many segments $\Delta s$), and using the fundamental theorem of calculus, we obtain EQ. 5, which is similar to EQ. 4a for a single short path segment, but which applies to a path of any length.

$$\frac{1}{2}\rho CdA\, I_a + Crr\, m I_t + W_{other} = \qquad \text{EQ. 5}$$
$$W_{pedaling} - \frac{1}{2}(m + I/R^2)(v_f^2 - v_i^2) - mg(h_f - h_i),$$

On the right side of EQ. 5, the first term $W_{pedaling} = \int P_{propel} dt$ is the work performed by pedaling during the entire path interval. The second term on the right expresses the decrease in kinetic energy in terms of a difference between the square of a final ground speed velocity ($v_f$) at the conclusion of a test protocol segment and the square of an initial ground speed velocity ($v_i$) at the initiation of the test protocol segment. The third term on the right expresses the decrease in gravitational potential energy mgh in terms of a final height ($h_f$) at the conclusion of the test protocol segment and an initial height ($h_i$) at the start of the test protocol segment. On the left side of EQ. 5, the first term is the energy loss due to air drag integrated over the path interval, in which the drag area CdA and air density $\rho$ are factored out of the integral, leaving the remaining integral $I_a$:

$$I_a = \int_{t_i}^{t_f} v_{air}^2 v\, dt = \int_{s_i}^{s_f} \bar{v}_{air}^2\, ds, \qquad \text{EQ. 6a,}$$

where $I_a$ is the integral of the measured speed of the vehicle through the air $v_{air}$ and the speed of the vehicle along the ground v. The second term on the left is the energy loss due to tire friction, which depends on the integral $I_t$:

$$I_t = \int_{t_i}^{t_f} a_{0\perp} \bar{v}\, dt = \int_{s_i}^{s_f} a_{0\perp}\, ds. \qquad \text{EQ. 6b.}$$

Applying EQ. 5 to a path, knowledge of the elevation change for each path interval is determined in order to calculate mg$\Delta$h, which can be accomplished by GPS measurement and/or comparison to known altitude data for the path (e.g., by "snapping to" the nearest location coordinate with a known altitude in a database). The third term on the left in EQ. 5 is simply the integration of other forces $F_{other}$ over distance to obtain the work done by other forces $W_{other}$. If brakes are applied, then the energy lost due to braking is the dominant contribution to $W_{other}$.

The coefficients CdA and Crr may be determined by arranging EQ. 5 the form y=mx+b with x=$I_a$/$I_t$ and y as the left side of EQ. 7 below.

$$\left(W_{pedaling} - \frac{1}{2}\left(m + \frac{I}{R^2}\right)(v_f^2 - v_i^2) - mg(h_f - h_i) - W_{other}\right)/(mI_t) = \qquad \text{EQ. 7}$$
$$\left(\frac{\frac{1}{2}\rho\, CdA}{m}\right)\frac{I_a}{I_t} + Crr.$$

As with the force-based analysis method, for each set of measurements taken or received by the mobile device 102, an (x, y) value pair is calculated, where $y =$ $$\left(W_{pedaling} - \frac{1}{2}\left(m + \frac{I}{R^2}\right)(v_f^2 - v_i^2) - mg(h_f - h_i) - W_{other}\right)/(mI_t) \text{ and } x = \frac{I_a}{I_t}.$$

A set of multiple such (x, y) value pairs may be calculated over the course of a given test protocol. For the work-energy analysis method, the (x, y) value pairs may be calculated after each test protocol segment. A linear regression or other statistical analysis of the set of (x, y) value pairs will yield a line fit and a determination of y-intercept=$C_{rr}$ and $$\text{slope} = \frac{1}{2}\rho CdA/m.$$

Using the determined slope, the mobile device 102 may solve for CdA upon determining the air density $\rho$, such as upon a lookup operation to the weather data 116.

In implementations where the reaction force is ignored, the resistive forces may still be determined, though with less precision than using EQ. 7. Ignoring the term $$\frac{I}{R^2}$$

or setting I=0, EQ. 7 can be written in the form y=m'x+b, as follows:

$$\left(W_{pedaling} - \frac{1}{2}m(v_f^2 - v_i^2) - mg(h_f - h_i) - W_{other}\right)/(mI_t) = \qquad \text{EQ. 7'}$$
$$\left(\frac{\frac{1}{2}\rho\, CdA}{m}\right)\frac{I_a}{I_t} + Crr.$$

Therefore, the resistive forces may be determined even when the vehicle wheel moments of inertia and vehicle wheel radius are unknown.

For the particular test protocol of a closed-loop, we may take advantage of the fact that the integral of $\Delta$h over any closed loop must be zero, so EQ. 5 may be evaulated for one or more laps of a closed-loop course, without the need to calculate mg$\Delta$h. In a closed-loop protocol, integrals $I_a$ and $I_t$ are numerically calculated once for each lap, and without knowledge of CdA or $C_{rr}$. This improves upon the VE strategy of re-calculating a slope integral for each variation on trial values of CdA and $C_{rr}$ and assuming the normal force of a flat grade. Instead, CdA and Crr can be determined simultaneously in a single calculation from a multilinear regression of EQ. 5 with $I_a$ and $I_r$ as the independent variables. Alternatively, at high speed (e.g., greater than 20 mph for a bicycle) a value of CdA may be determined by assuming a value of Crr and regressing on $I_a$ only. Similarly, at low speed (e.g., less than 10 mph for a bicycle) a value of Crr may be determined by assuming a value of CdA and regressing on $I_r$. Regression provides information on the uncertainty of the determined parameters.

Extensions: Other Resistive Forces

Resistance forces have been described in terms of model parameters CdA and Crr, but additional details may be added through simple extensions to EQS. 1-7. For example, in some implementations, drivetrain frictional losses can be modeled by including a multiplicative drivetrain efficiency fraction DE to $F_{propel}$ or $P_{propel}$ (a factor which itself may depend upon additional factors). In some implementations, frictional torque of the wheels can be included by adding a constant term FTL, which is equal to $\tau_F/R$, where $\tau_F$ is the net frictional torque of the wheels and R is the wheel radius. The dependence of the factor CdA($\psi$) on the yaw angle $\psi$ of wind relative to the vehicle can be accounted for by adding $\psi$ to the multivariable regression. In some implementations, EQ. 3a can be expressed in additional detail as:

$$\frac{1}{2}\rho CdA(\psi)v_{air}^2\cos^2\psi + C_{rr}N + FTL = DE \times F_{propel} + (m + I/R^2)a_{0,\|}. \quad \text{EQ. 8}$$

Modeling the angular dependence of CdA ($\psi$) as a polynomial, likely of degree 1, the angular dependence CdA ($\psi$) can be expressed as:

$$CdA(\psi) = CdA(\psi = 0)\left(1 + \sum_{n=1} c_n \psi^n\right), \quad \text{EQ. 9.}$$

Therefore, EQ. 3a can also be expressed in terms of these polynomial coefficients $$\frac{1}{2}\rho CdA(\psi = 0)\left(1 + \sum_{n=1} c_n \psi^n\right)v_{air}^2\cos^2\psi + C_{rr}N + FTL = \quad \text{EQ. 3c}$$
$$DE \times F_{propel} + (m + I/R^2)a_{0,\|},$$

which simply includes adding additional polynomial coefficients $c_1, c_2, \ldots$ to the list of desired coefficients. Similarly, EQ. 5 can be expressed as:

$$\left(\frac{1}{2}\rho CdA(\psi)v_{air}^2\cos^2\psi + Crr\,ma_{0\perp} + FTL\right)\Delta s = \quad \text{EQ. 10}$$
$$DE \times W_{pedaling} - \frac{1}{2}\left(m + \frac{I}{R^2}\right)(v_f^2 - v_i^2) - mg\Delta h,$$

The integral $I_a$ now depends on the desired number of polynomial coefficients $I_a$ ($c_1, c_2, \ldots$):

$$I_a(c_1, c_2, \ldots) = \int_{t_i}^{t_f}\left(1 + \sum_{n=1} c_n \psi^n\right)\cos^2\psi\, v_{air}^2 v\, dt = \quad \text{EQ. 11}$$

-continued
$$\int_{s_i}^{s_f}\left(1 + \sum_{n=1} c_n \psi^n\right)\cos^2\psi v_{air}^2\, ds,$$

and in regressing on the polynomial coefficients now includes the re-evaluation of integral $I_a$ ($c_1, c_2, \ldots$) using stored values of $\psi$, $\bar{v}_{air}^2$, and ds.

This disclosure is not limited to particular choices in how to model resistive forces for the question of interest. For instance, an additional factor may be added to EQS. 8-10 to include the effect of rotational drag without subtantially departing from the scope of this disclosure.

As an alternative to the regression approach, which is based on the assumptions associated with a frequentist approach to statistics, methods based on Bayesian inference (such as, but not limited to, Kalman filtering, "sensor fusion", square-root filtering) may be used. Bayesian methods may perform better with small data sets. Information on uncertainty of the determined parameters is made available. The above equations may also be used as the model for an artificial intelligence approach.

Practical Challenges

Given recorded sensor measurements and physical models associated with field testing protocols, significant practical challenges remain. The first challenge is the expertise to perform the many measurements correctly as an advanced laboratory experiment, and then to correctly perform a mathematical analysis with spreadsheets or software tools built for experts. Another significant challenge is the latency between measurement and analysis. In a wind tunnel test, a test director makes continual modifications based on instantaneous measurement feedback over the course of an hour or two. If an implementation of a field test protocol includes analysis on the computer with manual steps, then delays are introduced into the feedback loop, limiting the number of tests which can be performed. Aerodynamic field testing often must be performed during narrow windows of satisfactory weather and traffic conditions. The most significant practical challenge, however, is that the casual application of these protocols may result in inconsistent results, which will not be noticed unless multiple measurements are performed in close succession.

Significance

The real value in the measurements of CdA and Crr to both an expert and a novice comes from a careful determination and communication of the significance of the measurement. The problem with this lack of practical statistical analysis is that the error margin of interpretations (such as power savings) is often unknown: does the purchase of a $10,000 new bike save 10.0±0.1 W or 10±20 W? Significance is assessed in the ways described below.
1. Each measurement is compared to a previously-measured "baseline" value, by a calculated difference or by displaying a visual representation of the two values.
2. Each measurement is compared to an example for an aspirational limit for a tractor trailer may be a wind tunnel measurement for a modified tractor trailer, or an optimized computational fluid dynamics simulation.
3. The standard error of the calculated CdA and similar statistical metrics are used to assess significance by comparison to the error margins, whether the differences are greater than the error margin or not.

4. The measured CdA and Crr are interpreted terms of user-entered performance parameters to assess significance in terms of the user's goals in the domain of power, time.

To assist with these questions of significance, as well as the challenges that come with making sense of a multitude of measurements to answer different questions, a hierarchical "laboratory notebook" pattern of user interface screens is introduced, in which each organizational unit ("chapter") is for a particular comparison or a particular question. The pattern is referred to as a "laboratory notebook", in which there is one notebook per experiment protocol, which may include the ability to filter measurements based on common criteria. Examples of topics for individual notebooks may include the following: tire rolling resistance, air resistance while coasting, air resistance while pedaling, air resistance in a certain position, speed at threshold heart rate, and more. Because it is more realistic to assess differences in CdA rather than perform the controlled conditions to obtain absolute accuracy, the lab notebook hierarchy is organized into chapters, each with a research question (i.e. "which cycling helmet is the best, and what is the advantage of the best helmet?"). Each chapter may have a conclusion result, which may a particular experiment among the collection of chapter experiments that is selected as a conclusion. Each chapter may have a "baseline" result, which may be a chapter experiment selected as "baseline".

A test-director or "coaching" interface 2002 is disclosed which allows a test director or cycling coach to remotely monitor aerodynamic field testing laboratory notebooks, as well as to prescribe tests with included instructions. The test director interface adds an additional level of hierarchy to the laboratory notebook in which, for instance, a cycling coach will want to see a collection view of the list of athletes with some indication of their progress towards completing their assigned work and/or a summary result for each athlete. This summary result may be an interpretation of a chapter conclusion in terms of the preferred quantities: drag area, power, speed, time, or energy.

It is known that there is a trade-off between cyclist power output and optimal aerodynamic position. A simple metric is disclosed to evaluate this trade off: the measured CdA, Crr, HR (heart rate), and power are used to calculate the speed at the target heart rate intensity. This metric takes into account fitness as well in terms of what matters in a race. Speed may be calculated as a function of cyclist power for a given measured CdA, Crr, but the amount of power a cyclist can produce at a given HR may be reduced by a more aggressive aerodynamic. A cyclist may know an approximate heart rate (HR) that can be maintained during a race. Since the cyclist aerobic power output in a given position is linearly related to heart rate, the power output at the target heart rate intensity can be accurately projected by linear regression of HR and power data.

A convenient way to express the linear response model for HR as a function of cycling power is in terms of the heart-rate reserve HRR, which is the resting heart rate $HR_{rest}$ subtracted from the heart rate HR: $HRR=HR-HR_{rest}$. At zero HRR, the cyclist is producing zero watts, by definition. More convenient still is to use the percentage heart-rate reserve % HRR, which expresses HR as a percentage between resting and maximal rate $HR_{max}$:

% HRR=(HR–$HR_{rest}$)/($HR_{max}$–$HR_{rest}$)×100%.  EQ. 12

A cyclist at 0% HRR is producing zero watts, and a cyclist at 100% HRR would be producing 100% of the maximal aerobic power according to this linear model (however the linear relationship is only valid below the aerobic threshold, where anaerobic power production can be neglected). A sub-maximal aerobic power may be estimated from the "Functional Threshold Power" FTP, the maximal average power that a rider can maintain for 20 minutes to an hour (it is not possible to maintain anaerobic power for such long time intervals). A cyclist cannot, of course maintain 100% HRR for an hour, so the FTP corresponds to a certain % HRR(FTP). It is not feasible to conduct a 1 hour+ FTP test for each position, but the FTP in a given position may be estimated. The linear response model predicts that the FTP in a certain position would be equal to the measured power output in that position for a few minutes multiplied by a scale factor depending on % HRR(FTP) (which may be estimated by the lactate threshold) and the measured % HRR for that position $$\frac{Power}{FTP} = \frac{\% \ HRR}{\% \ HRR(FTP)}$$  EQ. 13

$$FTP = \frac{\% \ HRR(FTP)}{\% \ HRR} Power$$

For a measured CdA and Crr, the "threshold speed" corresponding to a power output $P_{propel}$=FTP equal to the estimated FTP in EQ. 13 can be calculated by solving EQ. 14 for speed $v=v_{threshold}$.

$$\frac{1}{2}\rho \, CdA \, v^3 + C_{rr}mgv = P_{propel}$$  EQ. 14

The cyclist position may be calculated by evaluating EQ. 14 for the CdA of various positions and solving for speed v: whichever solution yields a speed closest to the current speed is the likely cyclist position.

Mobile Device as a Power Meter

In addition to the above disclosures, the invention of a mobile app that enables the use of a mobile device as a cycling power meter or motorsports dynamometer is disclosed. Rather than using known vehicular power to determine coefficients CdA and $C_{rr}$ as unknowns, these coefficients may be measured in the coast-down protocol method 300 described below, used as a calibration procedure or estimated based on user-input rider position and physical measurements or vehicle description. The device collects sensor data, calculates the vehicle power, and acts as a head unit to display the calculated power based on the above EQs. using assumed or previously calculated values of CdA and $C_{rr}$.

More useful than many measurements of power for the cyclist is an analysis of power in relation to heart rate to evaluate fitness in summary. For example, fitness may be expressed as the power at a certain heart rate, since the aerobic power output of a cyclist is approximately linearly related to the cyclist's power output. Using EQ. 13, the FTP of a cyclist may be estimated from the collection of % HRR data throughout the ride. In addition, the position of the cyclist may be dynamically updated by substituting the current % HRR evaluating EQ. 14 for the CdA for each of multiple positions and determining which solved speed v is closest to the current speed.

Examples of the pending disclosure are provided below with reference to the figures. The examples shown are to be considered as illustrative and not restrictive, and the intention is not to be limited to the details given herein. For example, the various elements or components may be combined or integrated in another manner or certain features may be omitted or not implemented.

FIG. 1 illustrates an exemplary system 100 for determining resistive coefficients of a vehicle suitable for implementing the several embodiments of the disclosure. As shown, the system 100 includes a mobile device 102 (e.g., smart phone, tablet, etc.) which may be mounted to a vehicle 104, such as a bicycle, for determining the resistive coefficients of the vehicle 104. While various examples are provided throughout the disclosure of the vehicle 104 as a bicycle, the vehicle 104 may be any vehicle with one or more wheels. For example, a motorcycle, car, truck, scooter, skateboard, unicycle, etc.

The mobile device 102 comprises sensors 106 and a mobile application 108, whose operation is described in more detail below. The sensors 106 on the mobile device 102 may include one or more of a pressure sensor, Global Positioning System (GPS) sensor, accelerometer, gyroscope, or other such sensors. The mobile application 108 uses measurements from the sensors 106 to determine the resistive coefficients of the vehicle 104.

The vehicle 104 has a particular vehicle configuration 110, in the case of a bicycle or motorcycle the configuration may be the choice of wheels, position of rider, helmet worn, each of which may contribute to the resistive coefficients of the vehicle 104. In the case of a truck or tractor trailer, the configuration may include a camper shell, truck bed cover, towed vehicle, added aerodynamic flaps, etc. As described in more detail below, the mobile application 108 includes one or more user interfaces for receiving inputs on the current vehicle configuration 110 and other parameters used in determining the resistive coefficients of the vehicle 104.

The mobile application 108 may receive data or measurements from one or more vehicle sensors 112 mounted to the vehicle 104. For example, the vehicle sensors 112 may include an external power meter, wheel speed sensor, air speed sensor, or any other desired vehicle sensor. In some implementations, the mobile application 108 may be in communication with a vehicle computer 113 (such as a bicycle computer). The mobile application 108 may receive data from the vehicle computer 113, such as measurements from the vehicle sensors 112, and/or communicate data to the vehicle computer 113 for display on a user interface of the vehicle computer 113. For example, as described in detail below, one or more of the user interface screens of the mobile application 108 may be displayed by the vehicle computer 113.

In some implementations, the mobile application 108, or a portion thereof, may be executed on the vehicle computer 113 as opposed to the mobile device 102. In some implementations, the mobile device 102 is the vehicle computer 113.

In some implementations, the mobile application 108 may receive data or measurements from a vehicle-mounted aerodynamic sensor 111 either directly or via the vehicle computer 113. The aerodynamic sensor 111 includes one or more of the following sensors: an accelerometer, wind speed sensor, air pressure sensor, air temperature sensor, humidity or dewpoint sensor, angle sensor, or GPS sensor. In some implementations, the aerodynamic sensor 111 may be integrated into the vehicle computer 113.

Generally, any combination of the mobile device 102, vehicle computer 113, vehicle sensors 112, and aerodynamic sensor 111 as a single integrated device or multiple separate devices is contemplated by this disclosure.

The mobile device 102 may connect via a network 109, such as the Internet, to one or more remote systems. The remote systems may include a user data database 114 that may store preferences and configuration data for a user of the mobile application 108. The remote systems may additionally include a weather server or database 116 that may provide local weather conditions proximate to the mobile device 102, such as wind speed and direction. Other remote databases or applications may also be accessed by the mobile device, such as to obtain a current elevation of the vehicle 104.

FIG. 2 is a free-body diagram showing the forces on a vehicle traveling up a positive grade and down a negative grade. The propulsive force $\vec{F}_{propel}$ is in the direction of motion, the normal force $\vec{N}$ is perpendicular to the road surface, and the resistive forces $\vec{F}_{resist} = \vec{F}_{air} + \vec{F}_{tires} + \vec{F}_{react} + \vec{F}_{other}$ are in opposition to the direction of motion. The net force is the vector sum of the forces: $\vec{F}_{net} = \vec{F}_{resist} + \vec{N} + \vec{F}_{grav} + \vec{F}_{propel}$. From Newton's second law, the component of $\vec{F}_{net}$ along the direction of motion.

FIG. 3 is a flowchart of method 300 of using the mobile application 108 to determine aerodynamic drag for the vehicle 104 from sensor data from the sensors 106 in any ride in which brakes are not applied (the path does not need to be a closed-loop and elevation data is not used) using the force-based analysis method of EQs. 3a-3b. In the non-powered "coast-down" protocol, the vehicle begins at an initial speed and data is taken until the vehicle reaches a lower threshold speed. The initial speed may be a relatively fast speed for the vehicle 104 and the lower threshold speed may be a relatively slow speed for the vehicle 104. The initial speed may be greater than or equal to a minimum initiation speed, where the minimum initiation speed is at least a minimum amount greater than the lower threshold speed. In the related protocol in which the vehicle rolls down a hill at increasing speed, which may also be referred to as a "coast-down" protocol. If vehicle power can be measured, then the same protocol can be used for any path, provided that brakes are not used. For the purposes of this and following examples, the vehicle 104 is assumed to be a bicycle, though the methods of the pending disclosure are not so limited.

At 302, the mobile application 108 receives input of the description of the experiment, user-entered notes, or protocol instructions. The mobile application 108 includes a user interface for receiving an input of the mass of the vehicle 104, and at 302 the mobile application 108 receives an input of a mass of the vehicle 104 from the user interface. For example, for a bicycle in the particular vehicle configuration 110, a user may weigh themselves on a scale holding the bicycle and all equipment used, thereby measuring the weight of the vehicle system. Other methods of determining the weight of the vehicle may be used, such as summing the weights of each of the rider(s) and the components of the vehicle in the configuration 110.

At 304, the mobile application 108 receives an input of the wheels of the vehicle 104. By providing information on which wheels are used on the vehicle, the moment of inertia I of the wheels may be determined (or at least the ratio of I to wheel radius squared $I/R^2$). The moment of inertia of the wheels can be estimated by selecting from exemplary wheels shown in mobile application 108, or from a database on network 109 of wheels with known moments of inertia. In some implementations, the moment of inertia may be determined experimentally by entering inputs in the fields in the user interface of the mobile application 108, described in more detail below with reference to FIGS. 14C-14D. At 306, the mobile application 108 receives an input of the vehicle configuration 110 and unique test parameters. For example, the test parameters may include a particular equipment configuration (e.g., particular wheels for a bike, or aerodynamic flaps added to an 18-wheel truck), accessories used (e.g., particular helmet), a particular rider posture (e.g., hoods or drops position on a bicycle), or combination thereof. At 308, the mobile device 108 retrieves weather data from the internet weather database 116. The retrieved weather data may be used by the mobile device 108 to determine the air density, and in some implementations, determine a wind speed and/or direction.

At 310, once configured, the mobile application 108 may start the resistive forces measurement procedure, either for a coast-down (no vehicle power) protocol or riding with measured power output. During the measurement procedure, 312-330 occur repeatedly until the test is ended at 332. At 312, path distance, speed, and linear acceleration are measured. The most precise measurement of speed and linear acceleration can be obtained from vehicle-mounted speed sensor 112, such as a bicycle speed sensor. In some implementations the mobile app 108 may measure these parameters with only mobile device sensors 106, namely GPS (or other time-stamped location measurements). At 314, accelerometer measurements of proper acceleration d o obtained from mobile device sensors 106 or an external aerodynamic sensor 111 (which is to be distinguished from linear acceleration measured by wheel sensor or GPS) are recorded at 314 at the same rate as the measurements of 312, on the order of one recording per second (1 Hz). Because accelerometer measurements are subject to noise and are sensitive to vibrations from the road, the value recorded may be the result of the average of many measurements, such as the average of 100 measurements taken in the span of 1 second (at a rate of 100 Hz). In some implementations, a low-pass filter or a Bayesian update filter may be used to determine a meaningful accelerometer measurement. In some implementations, the wind speed is also measured at 316 using a pressure sensor or sound sensor on mobile device 102, or a mounted anemometer in the vehicle sensors 112 or in an external aerodynamic sensor 111. At 318, the propulsive power is measured, such as a bicycle power meter measurement, or the output of motorized vehicle diagnostics which includes power output of the engine. At 320, the net resistive force $F_{resist}$ is calculated from $F_{propel} + ma_{0, \parallel}$ (right side of EQ. 3a). At 322, the net resistive force is modeled (using the left side of EQ. 3a) to determine the model parameters CdA, Crr, and similar. These coefficients may be determined by linear regression, or a Bayesian update method such as Kalman filtering. At 324, the currently determined values of CdA and Crr may be displayed on a user interface of the mobile device 102, such as on a touchscreen display, or on a vehicle computer 113 (such as a bicycle computer). At 326, the mobile application 108 stores a sample record of the test results in a local database on the mobile device 102. Alternatively or additionally, a record of the test results may be stored in the remote user database 114. The sample record includes a current determination of the CdA and Crr for the vehicle 104 with the current vehicle configuration 110 and test parameters.

At 330, the mobile device 108 determines whether a user input is received to end the current test. If yes, then the test ends at 332. If not, then the process repeats at 312, as described above. Accordingly, throughout the duration of the test, the values of resistive coefficients (such as CdA and Crr) may be calculated multiple times at a rate determined by the wheel speed measurements 312 (typically 1 Hz), or the multiple measurements may be used to determine the resistive coefficients from linear regression. For a given test, the number of recorded measurements are on the order of the number of seconds of test duration, which may range from tens of seconds to thousands of seconds.

At 334, a record of the test results is stored by the mobile application 108 at 334 (e.g., locally on the mobile device 102 and synchronizing to the remote user database 114). At minimum, the test record includes the resistive coefficients (such as CdA and Crr) calculated at 332 as well as any inputs entered at 302-308. In some implementations, uncertainty information (such as standard error) for CdA and Crr is also stored. In some implementations, measurement data 312-318 and/or calculated data 320-324 may be stored.

FIG. 4 is a flowchart of method 400 of using the mobile device 102 to determine aerodynamic drag for a vehicle traveling using the work-energy ("energy conservation") analysis method shown in EQS. 5-7. As with the method 300, the mobile application 108 determines aerodynamic drag for the vehicle 104 (but using EQs. 5-7 instead of EQ. 4) from sensor data from the sensors 106 (or an external aerodynamic sensor 111) in any ride in which brakes are not applied. If vehicle power can be measured, then the same protocol can be used for any path, provided that brakes are not used. Such a protocol includes knowledge of altitude change along defined intervals of the path, such as one or more "laps" of a closed-loop path, or a path of known elevation profile. As discussed above, the path may be divided into segments, such as segments with a measurable change in height. At 402-418 and 430-434, the method 400 operates substantially the same as 302-318, and 330-334 described above. Accordingly, the description of these features is not repeated here in the interest of brevity. The differences are that elevation information may be used at 420 and 422 (EQS. 5 and 6) and that the mobile application 108 accepts input for recording the end of one or more laps (e.g., intervals of zero elevation change). In addition to the calculational procedure of method 300, the work-energy method 400 includes calculation of the path-interval integrals in EQ. 6 and the change in potential energy mg$\Delta$h. At 420, the net resistive energy loss is calculated using EQS. 5 and 6, in contrast to calculation of the net resistive force calculated in 320 using EQ. 3a. Adding information about change in elevation (e.g. zero for a closed-loop path) allows a simple way to take advantage of the work-energy relationship for improved accuracy, as well "averaging over" noisy sensor data for improved precision. The use of accelerometer sensor data to calculate normal force is an improvement in accuracy compared to the virtual elevation method.

FIGS. 5A-5D provide various user interface screens 502-508 of the mobile application 108 that show the "lab notebook" pattern for summarizing the measurements of each experimental measurements of drag area CdA, coefficient of rolling resistance Crr, or other model parameters of interest. Because for each question of interest (e.g. "which tires have the lowest rolling resistance?"), the user is likely to perform a distinct set of experiments, such questions and their accompanying experiments are organized into "chapters" in the lab notebook. The lab notebook chapter views (application screens) 502-508 include a collection view 502, or table view, showing the main result of various experiments for a particular chapter of the lab notebook. The setup screen 504 contains the user input interface for initiating a new experiment by collecting vehicle configuration information, test description and parameters, and weather data described in 302-308 and 402-408. The "dashboard" view 506 shows live measurement results while a new measurement is in progress. In some implementations the live measurement results may include drag area and/or coefficient of rolling resistance. Upon completion of the measurement, the experiment detail view 508 shows a detailed analysis of the measured results. In some implementations, the above description of dashboard view may be implemented on a vehicle computer 113 instead of the mobile device. The start, stop, and pause action inputs may be received by the vehicle computer 113. The calculations may be performed on the computer 113 or the mobile application 108.

The collection view 502 includes an experiment list 510 showing the main results for each of the experiments that have been performed. The text box 513 shows the question of interest for the chapter. An interpretation segmented controller 512 or equivalent provides selections for providing the main results of the experiments in the experiment list 510 as result 511 in different ways. For example, the difference between the measured drag area and some baseline value can be interpreted as a difference in power in order to maintain a given speed, a difference in speed given a power input, a difference in time for a race of a given distance, or a difference of energy expenditure over the course of a race. Interpretations are based on user-inputs 1208-1212 described in FIG. 12A. Explanatory text 517 is provided to explain the meaning of the calculated interpretation value. Upon selection of one of the experiments from the experiment list 510, the detail view 508 for that experiment may be shown. An edit button 514 or equivalent input method may be selected to delete an experiment or to change the ordering of the list of experiments. An add button 516 or equivalent may be selected to add a new experiment, or set of experiments.

Upon selection of the add button 516, the mobile application 108 displays an experiment set-up view 504. The experiment set-up view 504 includes text fields for a name 518 of the experiment to be performed. Aspects of the experiment that are not directly measured are accepted as notes input 520 (e.g. which helmet was used for a cyclist). In addition, the notes 520 may indicate important details (e.g. "wind speed 2 mph from the northwest"). At 522, the mass of the vehicle and rider system is entered (e.g., the mass input at 302 or 402). At 524, the air density determined at 308 or 408 is displayed. A segue is provided to the advanced weather data input view 602, shown in FIG. 6.

Figure 13:
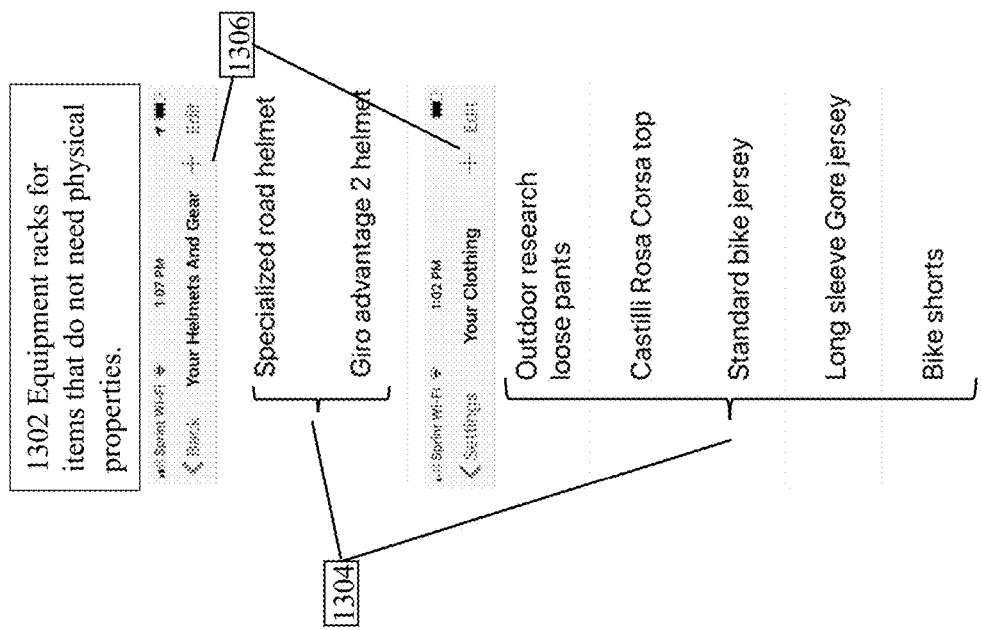
FIG. 13 is an exemplary user interface screen for equipment racks.

The experiment set-up view 504 also includes a set of vehicle configuration enumerated lists 526, referred to as "equipment racks", that specify the current vehicle configuration 110 for the experiment. The vehicle configuration fields 526 may be specified in the experiment set-up view 504 or another configuration view, such as shown in FIGS. 13-15, described below. Equipment rack items 1302 that do not need stored physical properties are presented as an enumerated list. Such items include vehicle accessories such as type of clothing worn by bicycle rider, or aerodynamic flaps installed on a truck. Vehicle wheels do need the input and storage of physical properties, which is provided by a segue to wheel rack 1402 described in FIG. 14. Input and storage of physical properties of the vehicle is provided by a segue to vehicle rack 1502. The posture of rider on the vehicle 104 (e.g., hands on bicycle handlebar "hoods" or "drops") is selected at 528 from an enumerated list.

In some implementations, numerical vehicle configuration parameters (e.g. bicycle seat height, "stack" height measurement y and "reach" measurement x) may be entered at 530. In some implementations, selection of the experimental protocol (method 300 or method 400) is provided at 532. If method 400 is used, then input is accepted whether it is a multiple-lap protocol (in which each lap has an elevation change of zero) or not. If not, then elevation data for the path must be determined by the GPS mobile device sensor 106 (or an external aerodynamic sensor 111), aided in some implementations by "snapping to" accepted elevation data obtained from an external database on network 109.

In order to facilitate performing repeated measurements (e.g. validation studies), the experiment set-up view 504 includes an "add next" button 534 to generate an identical experimental setup, for which the mobile app 108 accepts editing of one or more parameters. Such pending experiments are stored in the collection view 502, and selecting any pending experiment leads to setup view 504 with stored properties shown. After each completion of a pending experiment, the dashboard view 506 for the next pending experiment measurement is shown. A "done" button 536 that is selectable upon all of the fields in the experiment set-up view 504 being filled in is provided.

Upon selection of the done button 536, the mobile application 108 may display the dashboard view 506 on mobile application 108 or vehicle computer 113. Upon selecting the start action of button 546, the mobile application 108 may begin taking measurements using one of the experiment protocols such as method 300 or 400. In the dashboard view, identifying details about the experiment to performed are displayed in the form of the experiment name 540 and protocol instructions 542. A multi-state button is 546 is provided to start, stop, lap, or pause the experiment the status of the button 546 is updated to indicate the next option (e.g. after starting the experiment, change to indicate the "stop" action). The safety of the vehicle operator is enhanced by allowing the entire screen on the mobile device 102 to be used to trigger the button action for pause, start new lap 310 or 410, or end test 332 or 442, and such actions may be distinguished by gestures (such as "long-press" vs "tap"). The safety of the operator is further enhanced by providing audio feedback for the start, pause and stop actions. The dashboard view 506 also provides real-time feedback on various measurements being collected during the experiment, such as power 548 associated with the measured drag forces and calculated drag area 550. Additionally, one or more graphs 552 provide a historic view of measurements captured during the experiment so that the user may make adjustments mid-experiment, if desired. In some implementations, rider position 544 may be detected from measured drag forces and therefore the displayed status of rider position 544 can be updated and the value of rider position stored along with other measured experimental data. In some implementations, the above description of dashboard view may be implemented on a vehicle computer 113 instead of the mobile device. The start, stop, and pause action inputs may be received by the vehicle computer 113. The calculations may be performed on the computer 113 or the mobile application 108.

Following the end of an experiment, or upon selection of a completed experiment from the experiment list 510, the detail view 508 may be shown. The detail view 508 includes the name 560 of the experiment and the experimental notes 564, both of which can be edited. The detail view may also display non-editable experimental data 562, such as the date and time, rider position, equipment properties, etc. Summary results of the experiment are provided by expressing the measured drag area and coefficient of rolling resistance in numerical form at 566, with some indication of precision such as a meaningful number of significant digits determined from statistical analysis or a displayed confidence interval (e.g. drag area=0.28±0.05 m$^2$). A graphical comparison 568 shows a visual comparison of the confidence interval for the measured drag area 570 and a user-selected baseline value 574, as well as an aspirational limit 572 such as data taken from professional cyclists or another limiting value. In some implementations, the graphical comparison 568 may be made for other measured coefficients (such as rolling resistance), and a comparison made to user-selected measured baseline and to a reasonable limiting value 572. Such a comparison serves to provide significance to the measurement and to show the user whether they are making progress or not with respect to their baseline configuration 574 as well as how much additional progress may be reasonably possible with respect to the aspirational limit 572. In various implementations, the mobile application 108 may accept input at 592 that one of the experiments from the experiment list 510 may be designated as the baseline for comparison against in the chapter collection view 502. Similarly, the mobile application may accept input at 594 to set the experiment as the conclusion to the chapter of experiments, e.g. the experiment which answers the question "which tires have the lowest rolling resistance?".

Additionally, the detail view 508 provides an interpretation section with segmented controller 576 or equivalent which accepts input to select from interpretations including, but not limited to, power (watts), speed, time, and energy. Interpretations are based on user-inputs 1208-1214 described in FIG. 12. Calculated interpretations may be compared to those of a different experiment selected as a baseline value at 592. For example, the interpretation may show how much more power the user is able to supply to their bicycle, how much faster they may be able to go, how much less time they would need to complete a course, or how much less energy they are using based on the results of the current experiment as compared to the experiment designated at 592 as baseline for that chapter. Such comparisons are made with a graph 578 which includes the experimental measurement interpretation 580, the baseline measurement interpretation 584 (both of which may include a confidence interval), and an aspirational limiting value 582.

To assess the validity of the experimental measurement, detail view 508 may show a plot 586 which shows the consistency of the measurements throughout the experiment. For instance, a history plot of measured drag area vs speed in a coast-down protocol should demonstrate consistent values during both initial acceleration down a hill and final deceleration.

Detail view 508 may also show energy analysis information. Area plot 588 shows the power lost due to net resistive forces vs time. The choice of these axes in an area plot format has the advantage that the area under the power-loss curve represents energy lost over the segment. Adding a second curve for power loss due to only tire friction (the lower curve) shows an area representing the energy lost due to only tire friction, leaving the remaining area as the energy loss due to air resistance, and therefore showing a clear visual comparison of the relative importance of tire friction to air resistance. A similar plot could be made with net resistive force vs. distance, in which area would have the same interpretation. Line plot 590 is a second way of visualizing energy losses in the context of the elevation profile of the route. A line plot of potential energy vs distance is visually identical to the elevation profile of the route and therefore route features are immediately recognizable. A second line is plotted for the mechanical energy (kinetic energy plus potential energy), the "height" of the mechanical energy above the potential energy represents the kinetic energy as a function of elevation profile. If there were no resistive forces, then the mechanical energy would be constant with no vehicle/cyclist power input. With resistive forces, power input may be applied to attempt to maintain an approximately constant mechanical energy (faster on the downhill, slower on the uphill), in which case any decrease in mechanical energy at a certain point in the elevation profile represents an energy loss due to resistive forces that was not fully compensated for by power input.

Figure 6:
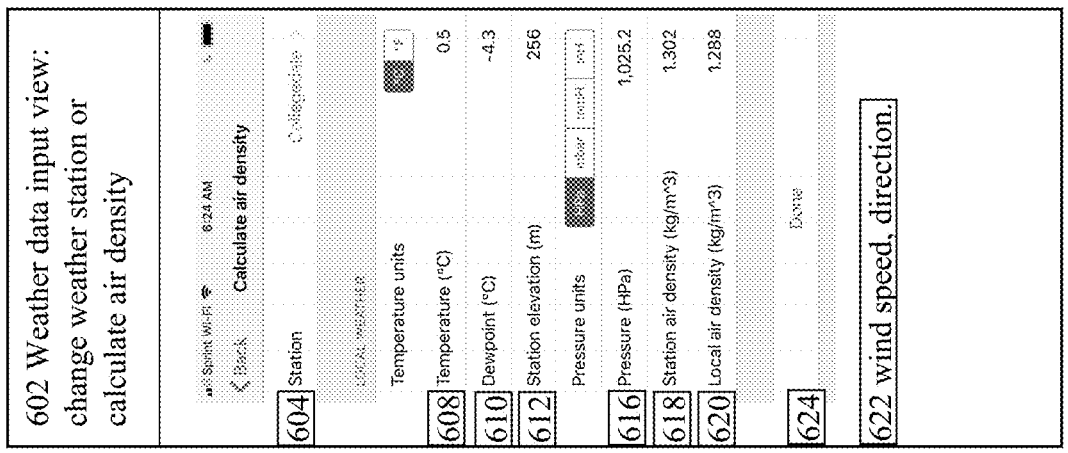
FIG. 6 is an exemplary user interface screen which collects weather data inputs used to calculate air density at current location, as well as current wind speed and direction.

FIG. 6 is a weather data input view 602 which accepts input for the weather station 604 used for the retrieval of data to calculate air density, in which case the retrieved values are shown at 608-612, 616. Alternatively, the user can either enter measured values of temperature 608, dewpoint 610, station elevation 612, and pressure 616 (as well as the associated units 606 and 614) to calculate the station air density 618. Local air density 620 is calculated at the local elevation by multiplying the station air density by a Boltzmann factor $e^{-mg\,\Delta h/k_B T}$, where m is the molecular mass, g is the gravitational acceleration, Δh is the altitude difference, $k_B$ is Boltzmann's constant, and T is the temperature. In some implementations, local air density 620 (or the calculation inputs 608, 610, and 616) may be obtained directly from an external aerodynamic sensor 111 or a personal weather station (either input manually at 620 or transmitted wirelessly). In such a case, the station elevation 612 is set equal to the current elevation (obtained from GPS sensor 106 or an external aerodynamic sensor 111), and the station air density 618 is set equal to the local air density 620. In some implementations, the current wind speed and direction may be displayed at 622. The wind speed and direction 622 is also stored, which can be used to estimate air speed (speed of the vehicle relative to air) and yaw angle (angle between air velocity and ground velocity) from the ground speed and heading. At 624 a "done" button or equivalent is provided to store the station air density and station elevation, which can be used to calculate local air density as elevation and/or temperature changes.

Figure 7B:
FIGS. 7A-7B are exemplary user interface screens of a lab notebook pattern, in which the summary result from each chapter, such as the chapter view described in FIG. 5A, is displayed.
Figure 7A:
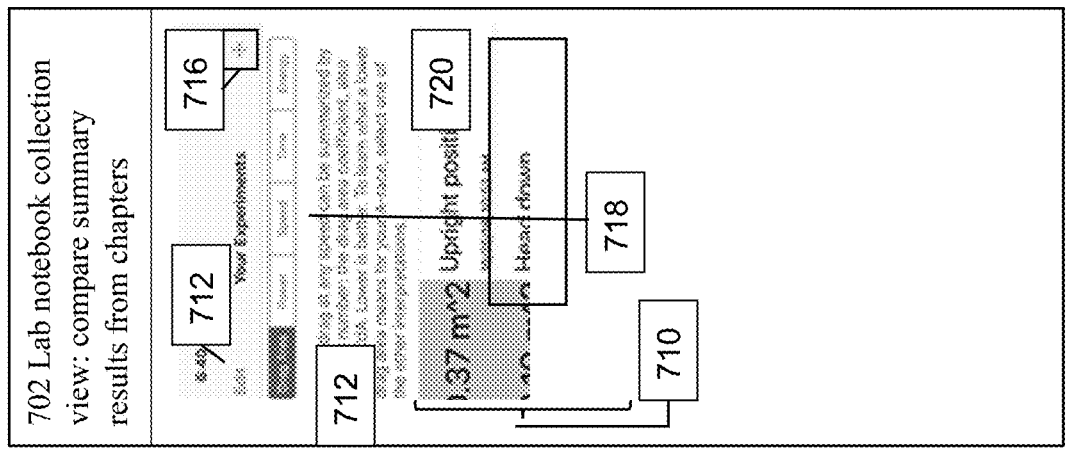

FIGS. 7A-7B is lab notebook chapter summary pattern view 702 which compares only the summary conclusion from each set of experiments in a chapter from each of the multiple chapter collection view 502 lists 510 in a single summary collection 710. Such a summary may be manually-input for each chapter or generated from the comparison data shown in the detail view of the experiment experiments marked as a chapter conclusion, as compared to a different experiment marked as baseline at 592. An add button 716 or equivalent may be selected to add a new experiment chapter. An interpretation segmented controller 718 or equivalent provides selections for providing the main results in the conclusions list 710 in different ways. For example, the main results may be shown in terms of drag area, power, speed, time, or energy as in each chapter collection view 502. Interpretations are based on user-inputs 1208-1214 described in FIG. 12A. FIG. 7B is a setup view 704 to design a new chapter of experiments. At 718 the input for the research question for the chapter is accepted. At 720 the type of protocol is specified. At 722, additional notes on the protocol or instructions are accepted.

Figure 8C:
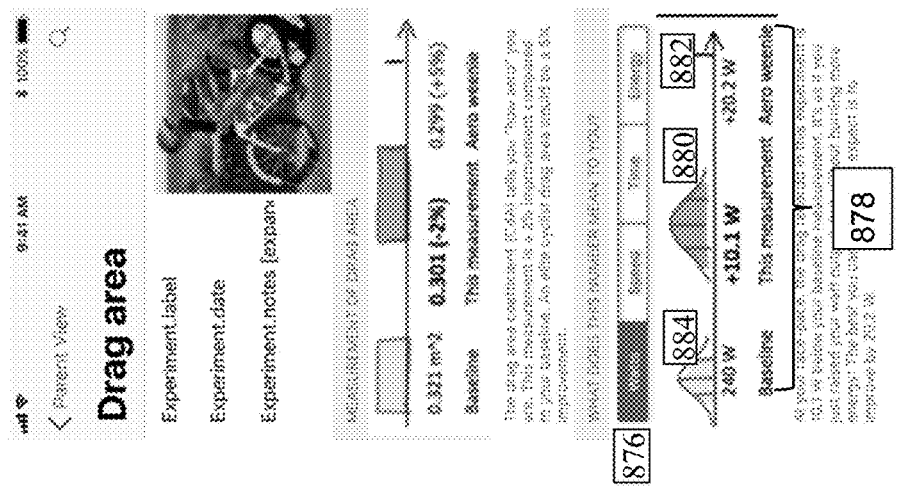
FIGS. 8B-8C are exemplary user interface screens illustrating the interpretation of power economy or an equivalent increase in power compared to a "baseline" reference value.
Figure 8B:
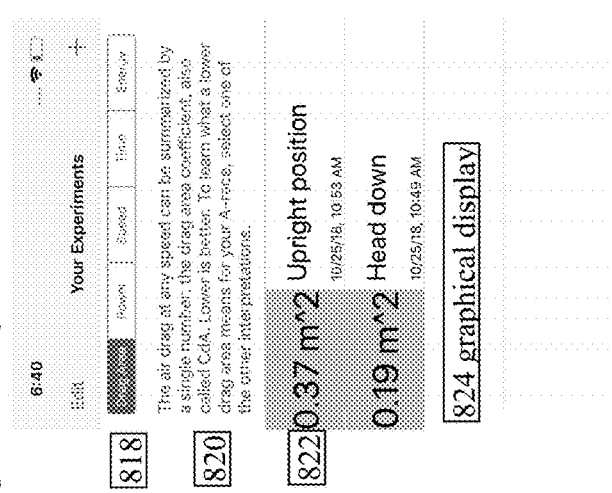
Figure 8A:
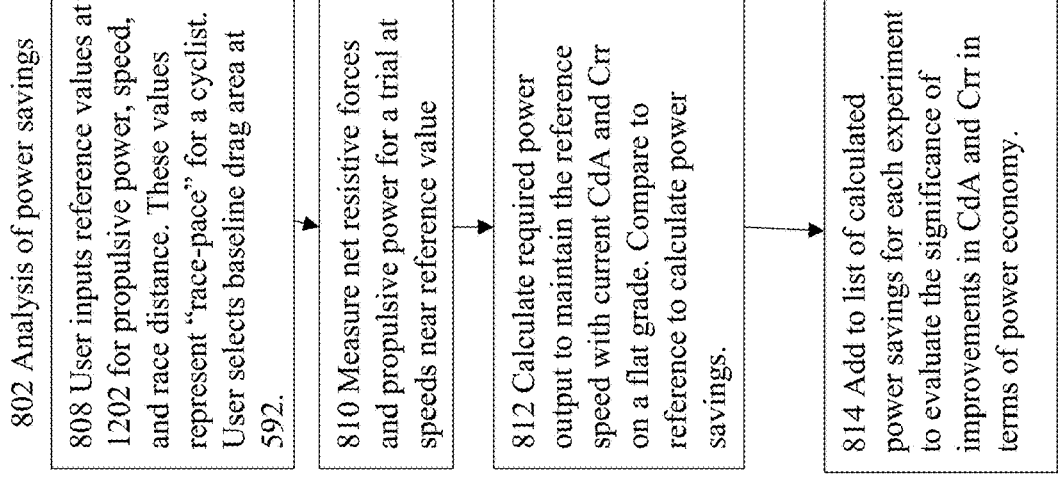
FIG. 8A is a flowchart of how an experiment is interpreted as power economy or an equivalent increase in power compared to a "baseline" reference value.

FIGS. 8A-8C shows how the measured CdA and/or Crr are interpreted in terms of power economy (savings in power to maintain a reference speed entered in the user objectives input view 1202). FIG. 8A is a flowchart of method 802 for analysis of power savings. At 808-814, the logical steps to perform an interpretation of measured CdA and Crr in terms of power savings/power economy are described. At 808, the user inputs reference values for propulsive power, speed, CdA, Crr, and race distance. Such inputs are given at 1208-1212 as shown in FIG. 12A. At 810, the net resistive forces are calculated for a trial at speeds near the reference speed 1212. At 812, the power output to maintain the reference speed 1212 on a flat grade with air density 1214 is calculated for both the currently-measured drag coefficients and also the coefficients for the baseline experiment at 592: the difference in power is interpreted as power savings. At 814, the calculated power savings for the experiment is saved, enabling a collection view of experiments which shows power savings. The collection view 804 is simply the chapter collection view 502 with the power interpretation selected on controller (518 in collection view 502). An interpretive text 820 is updated based on the selected interpretation 818. The calculated power savings for each experiment is displayed at 822. In some implementations, a graphical display 824 may compare the interpreted values among the collection of experiments (e.g. power savings, speed gains, etc.). The detail view with power selected 806 is simply detail view 508 with power selected on controller 576, shown as 876 in detail view 806. A graphical display 878 may show the measured drag area 880 with or without a confidence interval range, as well as the user-selected baseline measurement 884 and the calculated aspirational limit 882.

Similarly, FIGS. 9A-C show an interpretation of CdA in terms of speed gain (increased speed for the same reference propulsive power) instead of power savings. The logical steps to perform such interpretations are described in 910-916 are identical to those described in 810-816 with the replacement of power savings with speed gain. In the chapter collection view with speed selected 904, description 920, interpretation 922, and graphical display 924 are updated to reflect an interpretation in terms of speed, and the description of 920-924 is the same as that of 820-824 with the replacement of power savings with speed gain. In detail view with speed selected 906, speed has been selected on controller 976 and graphical display 878 with elements 880-884 described previously in terms of power savings is replaced with graphical display 978 with elements 980-984 which express speed gains instead of power savings.

Similarly, FIGS. 10A-C show an interpretation of CdA in terms of time savings (decreased time to complete a course with the same reference propulsive power) instead of power savings. The logical steps to perform such interpretations are described in 1010-1016 and are identical to those described in 810-816 with the replacement of power savings with time savings. In the chapter collection view with time selected 1004, description 1020, interpretation 1022, and graphical display 1024 are updated to reflect an interpretation in terms of time, and the description of 1020-1024 is the same as that of 820-824 with the replacement of power savings with time savings for a flat course of length 1210. In detail view with time selected 1006, time has been selected on controller 1076 and graphical display 878 with elements 880-884 described previously in terms of power savings is replaced with graphical display 1078 with elements 1080-1084 which express time savings instead of power savings.

Figures 11A, 11B, 11C:
FIG. 11A is a flowchart of how an experiment is interpreted as energy savings for a given speed and course of travel compared to a "baseline" reference value and FIGS. 11B-11C are exemplary user interface screens illustrating this interpretation and comparison.

Similarly, FIGS. 11A-C show an interpretation of CdA in terms of energy savings (decreased energy consumption to complete a course with the same reference speed). The logical steps to perform such interpretations are described in 1110-1116 are identical to those described in 810-816 with the replacement of power savings with energy savings. In the chapter collection view with energy selected 1104, description 1120, interpretation 1122, and graphical display 1124 are updated to reflect an interpretation in terms of energy instead, and the description of 1120-1124 is the same as that of 820-824 with the replacement of power savings with energy savings. In detail view with energy selected 1106, energy has been selected on controller 1126 and graphical display 878 with elements 880-884 described previously in terms of power savings is replaced with graphical display 1178 with elements 1180-1184 which express energy savings instead of power savings.

FIG. 12A is an exemplary user objectives input interface screen which accepts inputs used for the interpretations of measured drag area described in FIGS. 9-11. User objectives input view 1202 shows the user objectives either in the context of a bicycle race, a motor vehicle race, or a fleet vehicle driving segment. At 1208 reference power is input based on the use-case scenario of interest, such as a cyclists' race-pace power output (known to cyclists as functional threshold power FTP, critical power CP, or their known average power from a similar race) or the vehicle power output in Watts or horsepower for a path of interest. The path distance is input at 1210 and the expected speed is entered at 1212. For a bicycle or motorsports race, these quantities would represent "race-pace", and for fleet vehicle application, these quantities would represent a path length of interest at a typical speed. Because the power lost to air resistance depends on air density, the assumed air density used in comparison calculations is input at 1214, either as a numerical input or by calculation based on altitude and expected temperature.

In FIG. 12B at 1204, the user is guided to estimate an aspirational limit for the drag area of the cyclist or vehicle. In the simplest implementation, exemplary measured wind tunnel results are provided for the user to select as an aspirational limit. An aspirational limit may also be calculated using a regression model for wind tunnel measurements. Input view 1204 illustrates how drag area may be estimated from regression data in the example of a cyclist of known height and weight. At 1220, the cyclist position and/or bicycle type is selected (e.g. "aero position" on a time-trial bike, "hoods" position on a road bike, upright position on a mountain bike). At 1222, the cyclist's height is recorded, and at 1224, the cyclist's mass is recorded. At 1226, the drag area coefficient CdA is calculated from a model for a professional cyclist of similar build, based on a multilinear regression of wind tunnel measurements of multiple cyclists. Modeled drag area CdA 1226 is used as an aspirational limiting value, to let the user know when they are approaching diminishing returns. In some implementations, the drag area CdA may be estimated by separately estimating the unitless Cd coefficient (by providing a selection of Cd values for various shapes) and measuring cross-section area A in units of $m^2$. For cyclists, the reference Cd values may be given for positions that are progressively more aerodynamic. For motor vehicles, Cd values may be given for vehicles of different profiles such as sedan, fastback, tractor-trailer, etc. Cross-section area A can be estimated by taking a picture, counting pixels and selecting a coefficient Cd based on reference values.

FIG. 13 shows the equipment rack pattern 1302 for items which may impact the measured drag forces, but do not have any associated physical details that must be stored. For each equipment category, a list of string descriptions 1304 is provided so that the equipment used in an experiment can be selected from an enumerated list 1304 rather than described with free-form input. New equipment can be added with a button 1306.

Figures 14A, 14B, 14C, 14D:
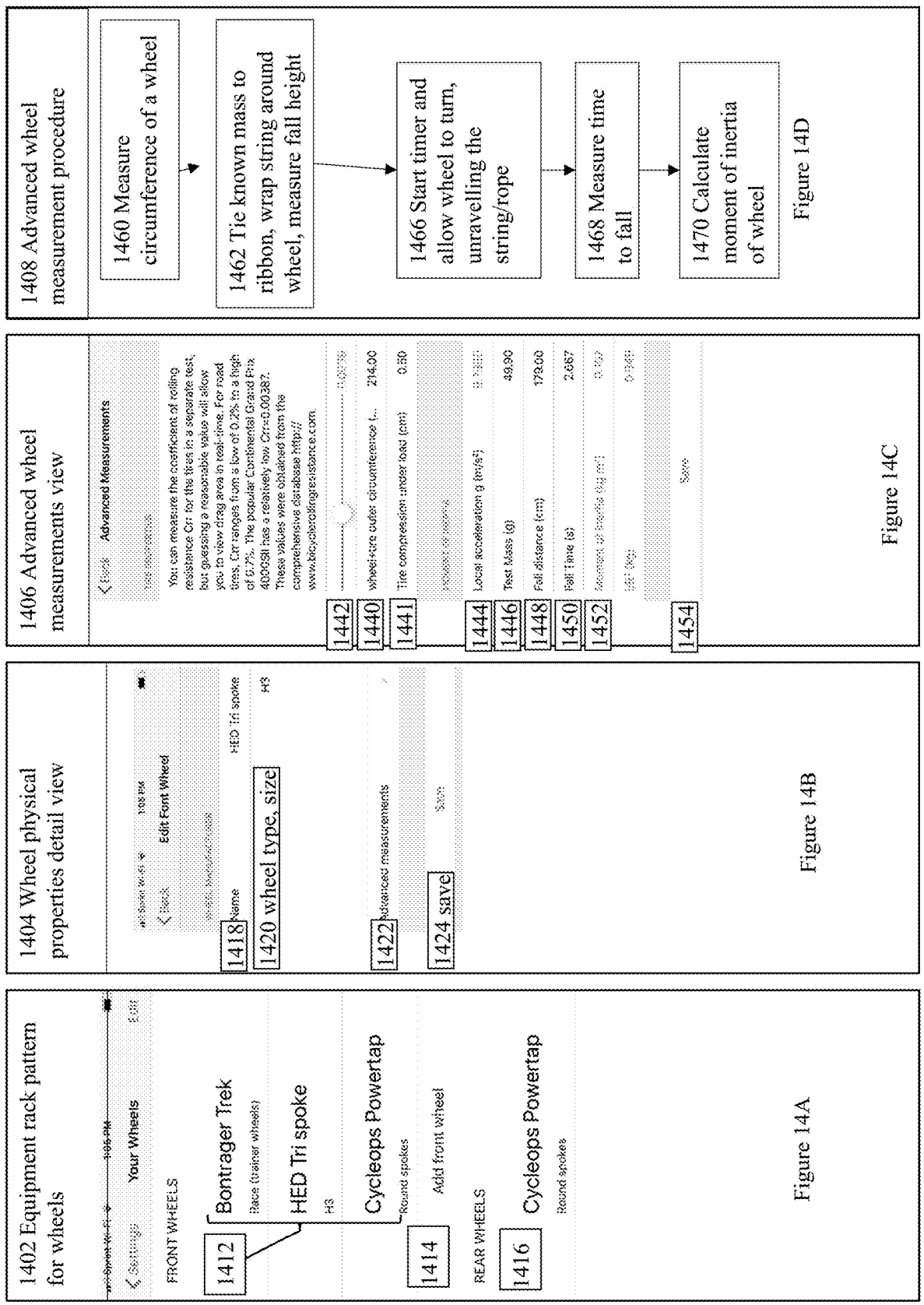
FIGS. 14A-14B are exemplary user interface screens of an equipment rack pattern for wheels, including the storage of the physical properties of radius and moment of inertia.
FIG. 14C is an exemplary a user interface screen which collects information to calculate wheel moment of inertia.
FIG. 14D is a flowchart of the procedure to calculate the moment of inertia of a wheel.

FIGS. 14A-14B are exemplary interface screens for the equipment rack for wheels collection view 1402. At 1412, a list of wheels is shown, which may be separated into front wheels 1412 and rear wheels 1416 in some implementations (because front and rear bicycle wheels cannot be interchanged). An add button 1414 adds a new wheel, showing wheel physical properties view 1404. Each wheel object in 1402 has stored physical properties from 1404. Input of the wheel description (such as model and manufacturer) is accepted at 1418. At 1420 simple wheel type information (e.g. 700c steel rim, 23 mm tire) is specified to estimate moment of inertia I and the ratio $I/R^2$, where R is the radius of the tire. At 1422, a segue to the optional advanced measurements 1406 is provided FIG. 14C is an exemplary user interface screen 1406 for advanced wheel measurements. At 1442 the coefficient of friction for the wheel is estimated by comparison to reference values for similar wheels. At 1440 the input of the outer circumference of the tire is accepted. In some implementations, the reduction of wheel radius due to compression of the tire is entered at 1441. The local acceleration of gravity is calculated and displayed at 1444 from the user's latitude, longitude, and altitude from any standard model of the earth's gravitational field. A measurement procedure 1408 described in FIG. 14D is used to calculate the moment of inertia, in which a known mass attached to a ribbon which is wrapped around the wheel is allowed to fall a certain distance, causing the wheel to spin. Input of test mass used in measurement procedure 1408 step 1464 is accepted at 1446. Input of the fall distance for the mass during step 1466 is accepted at 1448. Input for the fall time of the mass during step 1468 is accepted at 1450. The calculated moment of inertia I and/or the ratio of $I/R^2$ (where R is the radius of the wheel) is displayed at 1452. At 1454 a button is provided to save these values and return to the detail view 1404, replacing the estimated value determined at 1420.

FIG. 14D is a flowchart for procedure 1408 in which the mobile application 108 guides the user to measure wheel moment of inertia, through logical steps 1460-1480. At 1460, the wheel circumference is measured. At 1462, known mass is attached to a ribbon which is wrapped around the circumference of a wheel and the fall distance of the mass is measured. At 1466, a timer is started and the wheel is allowed to turn freely. At 1468, the timer is stopped when the mass hits the ground. At 1470, the moment of inertia of the wheel is calculated and stored.

FIG. 15A is an equipment rack pattern for vehicles 1502 and a FIG. 15B is a detail view 1504 for each vehicle. The collection or table of vehicles is shown at 1510. A new vehicle can be added by use of a button 1512. In the detail view 1504 for each vehicle, a name or identifying label 1520 is input. At 1522, a calibration sequence 1506 is initiated to determine the orientation of the mobile device 102 on the vehicle 104. In some implementations, the mass of the vehicle can be entered at 1524. At 1526, a numerical vehicle configuration parameter x is entered, which may represent the "reach" of a bicycle fit or some similar vehicle measurement. At 1528, an additional numerical vehicle configuration parameter y is entered, which may represent the "stack" of a bicycle fit or some similar vehicle measurement. At 1530, a save button stores the data. FIG. 15C is a flowchart of the calibration sequence 1506 to determine a unit vector in the forward direction $\hat{u}_\parallel$ and in the upward direction $\hat{u}_\perp$ in order to specify the orientation of mobile device 102 on the vehicle 104. The component of proper acceleration in the forward direction $\vec{a}_{0,\parallel}$ is determined from the dot product $\vec{a}_{0,\parallel} = \vec{a}_0 \cdot \hat{u}_\parallel$ and the component of the proper acceleration in the upward direction $\vec{a}_{0,\perp}$ is determined from the dot product $\vec{a}_{0,\perp} = \vec{a}_0 \cdot \hat{u}_\perp$. At 1540, the mobile device 102 is mounted on a stationary vehicle 104. If the vehicle is a bike, then the bike is balanced on a level surface in a direction perpendicular to the level surface. For example, the bike may be balanced on the surface of a garage floor. At 1542, the accelerometer data is stored as a reference vector pointing in the upward direction (away from the center of the earth in the current orientation of mobile device 102). At 1544, provision is made for the possibility that the vehicle 104 is not on a level surface by turning the vehicle 104 around 180° and an additional accelerometer measurement is recorded. The average of these two stored values is computed at 1544 as the vector which would point in the upward direction if the vehicle 104 were on a level surface. At 1546, the upward vector is divided by its magnitude to calculate a unit vector in the upward direction and the value is stored as a property of vehicle 104.

Figure 16A:
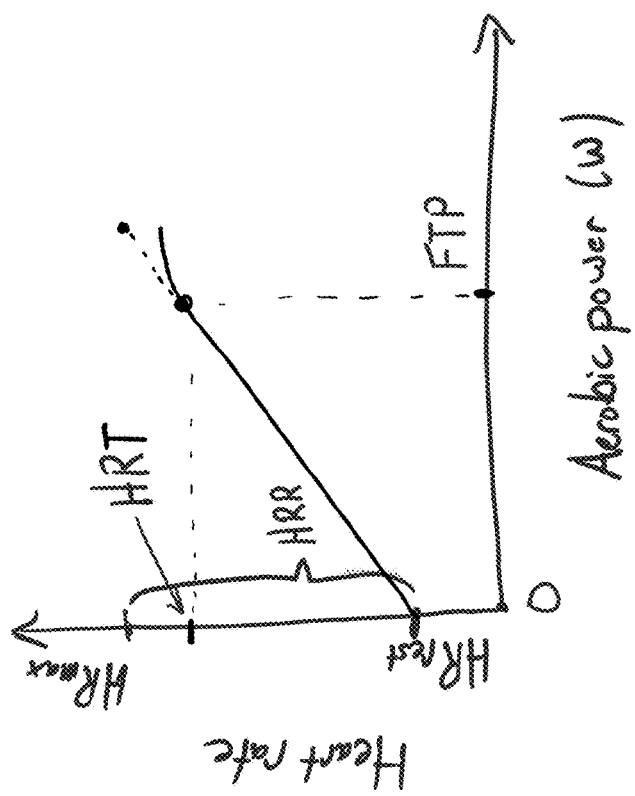
FIG. 16A is an exemplary graph of the linear relationship between heart rate and aerobic power and FIG. 16B is an exemplary graph of the linear relationship between speed-cubed and heart rate.

FIG. 16A shows a relationship between a cyclist's heart rate and aerobic power, which is approximately linear for aerobic power at or below some threshold value such as the functional threshold power FTP. The heart rate corresponding to this threshold value is referred to as heart rate threshold HRT. At a resting heart rate $HR_{rest}$, the aerobic power output is 0 W, and as the HR increases above $HR_{rest}$, the aerobic power increases linearly until the heart rate threshold HRT is reached. The HRT represents the maximal heart rate for purely aerobic energy production, and a HR above HRT indicates an anerobic effort and thus the linear relationship between HR and power will not continue for a HR above HRT. The maximal aerobic power that a cyclist can sustain for 60 minutes is called Functional Threshold Power (FTP), and so it is expected the power output at HRT should be equal to the FTP. Equivalently, the critical power CP for a certain time interval may be used instead of FTP: the CP at 60 minutes is essentially the FTP. At a HR between HRrest and HRT, proportional reasoning may be used to estimate power output as a percentage of FTP, as shown in EQ. 13. If, for example, the HRT is 80% HRR, then the power output at a HR of 70% HRR would be FTP×70/80. These calculations depend on the user-inputs for HRT and FTP, which can be measured by commonly known protocols involving intense efforts of 20-60 minutes.

Figure 16B:
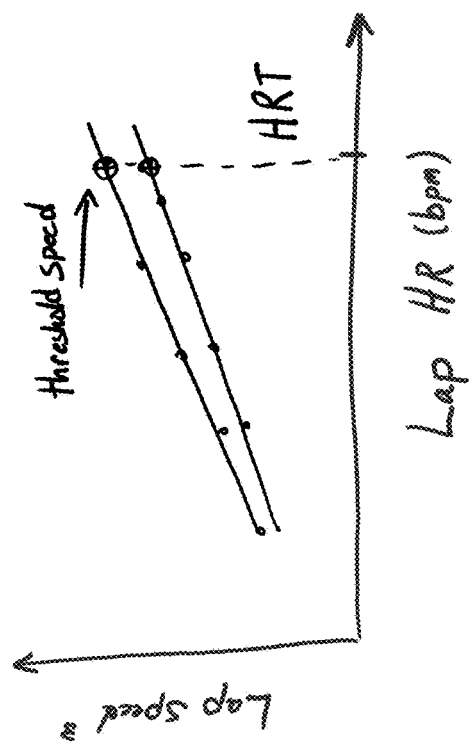

FIG. 16B is a linear relationship between speed cubed vs heart rate for different multi-lap experiments. Because HR is proportional to power and power is proportional to speed cubed, we can expect a linear relationship between lap speed cubed and lap HR. If a cyclist is configured in a more aerodynamic position that constrains movement, the net result may actually be a decrease in performance (speed for a given HR). Threshold speed is here defined as the speed corresponding to HRT, which is a summary of the balance between aerodynamic position and power output: higher is better. The experiment with the highest threshold speed represents the most optimal combination of aerodynamics and cyclist power output.

FIG. 17 is a flowchart of method 1700 of using a mobile application as a power meter/dynamometer. The description of 1702-1734 is identical to 302-334 with a few notable differences. At 1720, the known drag area and rolling resistance coefficients measured during calibration procedure 1800 are used to calculate the unknown power, in contrast to at 320, in which the resistive coefficients are using measured power to determine unknown drag area and rolling resistance coefficients. At 1732 the analysis of ride data is changed from 332 to analyze power output and heart rate rather than resistance.

Figures 18A, 18B, 18C, 18D:
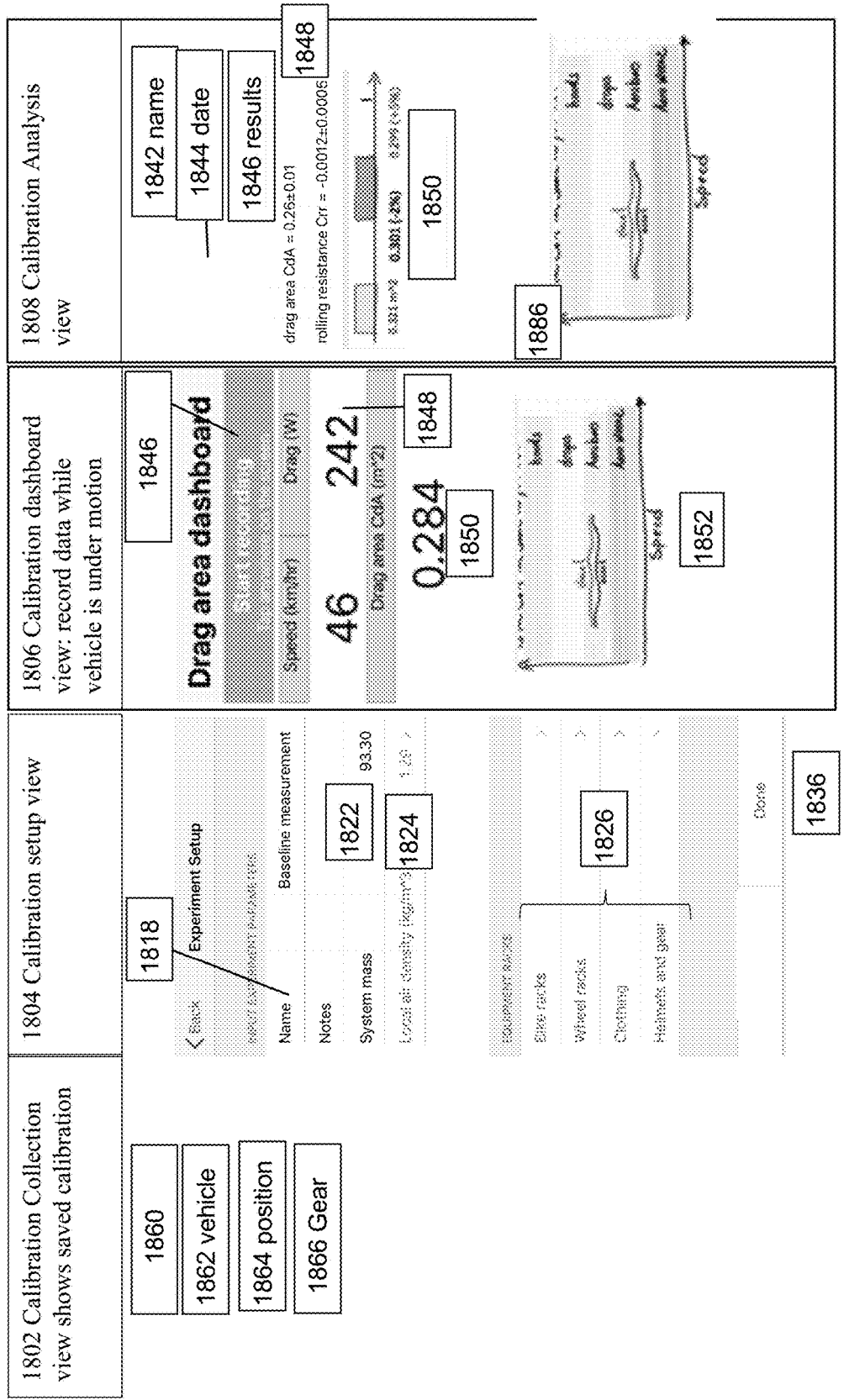
FIGS. 18A-18D are exemplary user interface screens for the power meter application coast-down calibration sequence to determine drag area and rolling resistance for a particular vehicle configuration.

FIGS. 18A-18D show coast-down drag measurement protocol sequence to determine drag area and rolling resistance for a particular vehicle configuration, which is organized in a pattern similar to the laboratory notebook. FIG. 18A is a collection view 1802 of calibrations which may be shown, because there may be a variety of calibrations due to different vehicle/rider configurations. At 1860, the name and date of the calibration data is displayed. At 1862, 1864, and 1866 the choices of vehicle, position, and gear, respectively, are displayed. FIG. 18B is setup view 1804, which stores system mass (vehicle+rider) at 1822 and current air density at 1824. In some implementations, the name or other identifying information for the calibration data may be given at 1818, and the equipment used may be specified at 1826, just as described at 526. FIG. 18C is calibration dashboard view 1806, which is just like the ride dashboard view 506: start/stop button 1846 functions as button 546 and consistency check 1836 is just like 552. In some implementations, the speed may be shown at 1822 and the net drag force or power may be shown at 1834. FIG. 18D is calibration analysis 1808, which is similar to experiment detail view 508: the calibration may be named at 1842, the date is shown at 1844 and the measured drag area and rolling resistance coefficients may be represented as numerical values 1848 or in graphical form 1850. Consistency check 1836 may be shown in this analysis view.

Figures 19A, 19B, 19C, 19D:
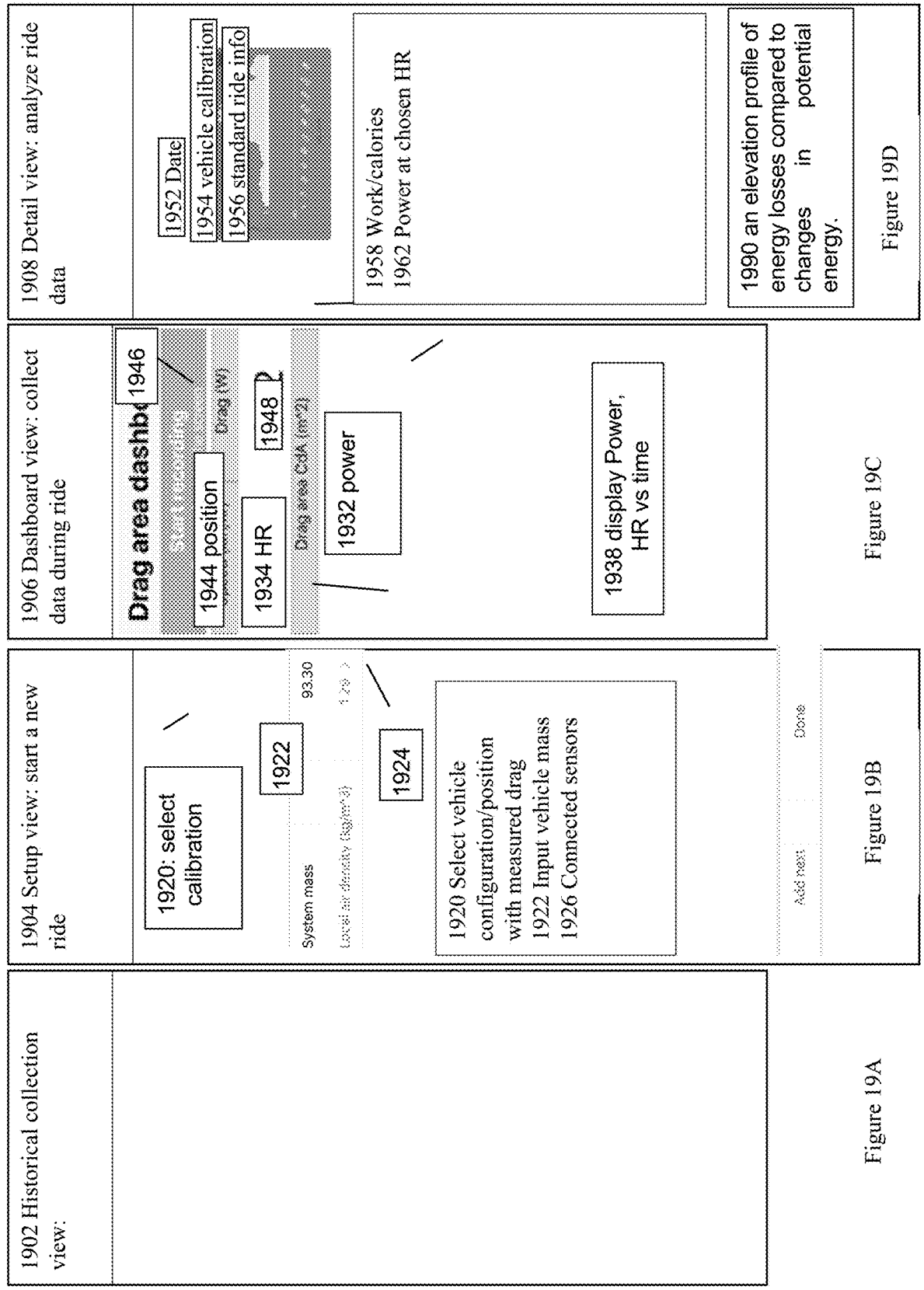
FIGS. 19A-19D are exemplary user-interface screens for real-time calculation of vehicle power ("dynamometer" data).

FIGS. 19A-19D show real-time calculation of bicycle or vehicle power. FIG. 19A is a historical collection view. FIG. 19B is ride setup view 1904, which accepts at 1920 the selection of the calibration appropriate for the current vehicle configuration from calibration collection view 1808. The vehicle mass input is accepted at 1922, and air density is shown at 1924, with the option to examine or change the calculated air density from weather data input view 602 in FIG. 6. At 1926, setup view 1904 provides a list of vehicle sensors 112 and in some implementations an external aerodynamic sensor, showing the connection status of each sensor and providing the ability to connect to disconnected sensors. FIG. 19C is ride dashboard view 1906, which shows real-time measurements of power. Start/stop button 1946 functions as button 546, previously described. The calculated power is shown at 1932. The net drag force or power is shown at 1948. The heart rate (for a cyclist) or rpm (for a vehicle) is shown at 1934. In some cycling implementations, the rider position 1944 (based on whether hands are on the "aero bars", "drops", or "hoods" or even "braking") may be detected based on HR and speed using EQS. 13-14. At 1938 graphical displays of power, HR (for a cyclist), RPM (for a vehicle), time, and/or speed are shown. At 1990 a potential energy elevation profile plot is shown identical to 590. In a motor vehicle application, 1938 may display RPM instead of HR. FIG. 19D is a detail view 1908 summarizing the trip data 1956 for power over time, as well as energy expenditure, heart rate (for cyclists) and rpm (vehicles). At 1952, the time and date are shown. At 1954, the chosen vehicle calibration is shown. At 1958 the net work (Calories, Joules, or equivalent) is shown. At 1962 the average power at a chosen threshold heart rate HRT is shown, as calculated by EQ. 13. At 1990 the energy losses are shown along with elevation profile, previously described as 590.

In some implementations, the above description of dashboard view may be implemented on a vehicle computer 113 instead of the mobile device. The start, stop, and pause action inputs may be received by the vehicle computer 113. The calculations may be performed on the computer 113 or the mobile application 108.

It should be appreciated that the logical operations described herein with respect to the various figures may be implemented (1) as a sequence of computer implemented acts or program modules (i.e., software) running on a computing device (e.g., the computing device described in FIG. 20), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 20:
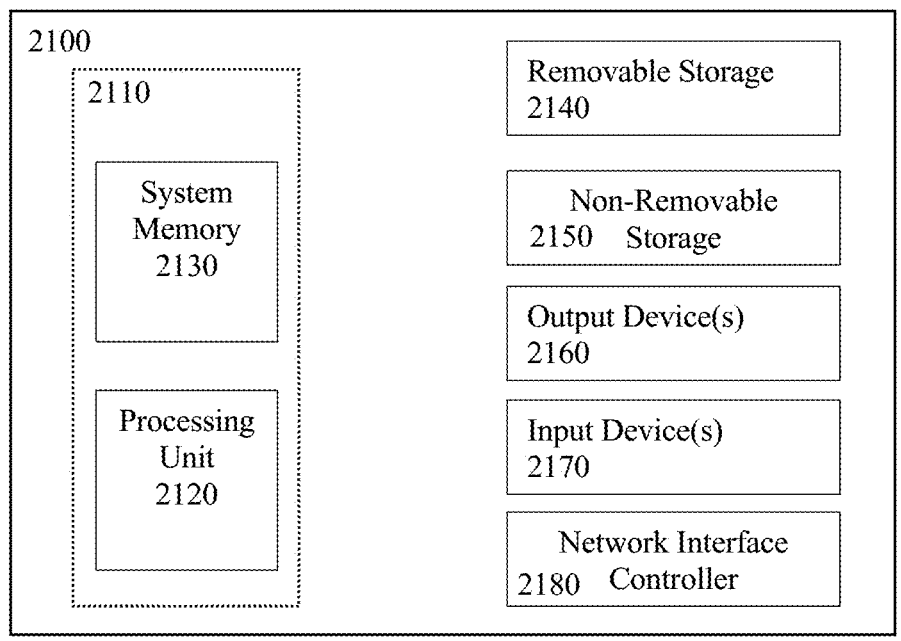
FIG. 20 illustrates an exemplary computer system suitable for implementing the several embodiments of the disclosure.

Referring to FIG. 20, an example computing device 2100 upon which embodiments of the invention may be implemented is illustrated. For example, the mobile device 104 or vehicle computer 113 described herein may be implemented as a computing device, such as computing device 2100. It should be understood that the example computing device 2100 is only one example of a suitable computing environment upon which embodiments of the invention may be implemented. Optionally, the computing device 2100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 2100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 2100 to provide the functionality of a number of servers that is not directly bound to the number of computers in the computing device 2100. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 2100 typically includes at least one processing unit 2120 and system memory 2130. Depending on the exact configuration and type of computing device, system memory 2130 may be volatile (such as random access memory (RAM)), non-volatile (such as read-only memory (ROM), flash memory, etc.), or some combination of the two. This most basic configuration is illustrated in FIG. 20 by dashed line 2110. The processing unit 2120 may be a standard programmable processor that performs arithmetic and logic operations for operation of the computing device 2100. While only one processing unit 2120 is shown, multiple processors may be present. Thus, while instructions may be discussed as executed by a processor, the instructions may be executed simultaneously, serially, or otherwise executed by one or multiple processors. The computing device 2100 may also include a bus or other communication mechanism for communicating information among various components of the computing device 2100.

Computing device 2100 may have additional features/functionality. For example, computing device 2100 may include additional storage such as removable storage 2140 and non-removable storage 2150 including, but not limited to, magnetic or optical disks or tapes. Computing device 2100 may also contain network connection(s) 2180 that allow the device to communicate with other devices such as over the communication pathways described herein. The network connection(s) 2180 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 2100 may also have input device(s) 2170 such as a keyboards, keypads, switches, dials, mice, track balls, touch screens, voice recognizers, card readers, paper tape readers, or other well-known input devices. Output device(s) 2160 such as a printers, video monitors, liquid crystal displays (LCDs), touch screen displays, displays, speakers, etc. may also be included. The additional devices may be connected to the bus in order to facilitate communication of data among the components of the computing device 2100. All these devices are well known in the art and need not be discussed at length here.

The processing unit 2120 may be configured to execute program code encoded in tangible, computer-readable media. Tangible, computer-readable media refers to any media that is capable of providing data that causes the computing device 2100 (i.e., a machine) to operate in a particular fashion. Various computer-readable media may be utilized to provide instructions to the processing unit 2120 for execution. Example tangible, computer-readable media may include, but is not limited to, volatile media, non-volatile media, removable media and non-removable media implemented in any method or technology for storage of information such as computer readable instructions, data structures, program modules or other data. System memory 2130, removable storage 2140, and non-removable storage 2150 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 2120 may execute program code stored in the system memory 2130. For example, the bus may carry data to the system memory 2130, from which the processing unit 2120 receives and executes instructions. The data received by the system memory 2130 may optionally be stored on the removable storage 2140 or the non-removable storage 2150 before or after execution by the processing unit 2120.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Non-Exhaustive List of Features of Disclosure

A method of use of a mobile device to measure aerodynamic drag coefficient CdA, rolling resistance coefficient Crr and other modeled resistive coefficients
Using a force-based analysis of accelerometer measurements, using proper acceleration to avoid measuring grade angle
regressing on force vs speed ^2 data in EQ 3
Using a work-energy analysis of elevation changes
Using accelerometer to measure normal force instead of assuming N=mg.
Directly calculation of air drag integral $I_a$ and tire friction integral $I_t$ in EQ 5 to solve for CdA and Crr by regression or "sensor fusion" (instead of VE method of fiddling with CdA and Crr)
A method of use of a mobile device as a power meter/dynamometer
A method of use of a mobile device to perform comparative analysis of measured results
Significance of difference between two results compared to the error margins
Significance compared to baseline
Significance compared to ideal limit
Significance terms of goals (power savings, speed gain, time saved, energy saved)
Lab notebook hierarchical organization of measured results
Each experimental question has a set of experiments ("chapter")
Summary of each question is in terms of a difference between baseline and a best value
Threshold speed metric
Linear response model to project threshold speed

What is claimed is:

1. A method of determining resistive coefficients of a vehicle using a force-based analysis method, the method comprising:
receiving, via a mobile application executing on a mobile device mounted to a vehicle, an input to initiate a test protocol along a path;
recording, by the mobile application, a set of measurements for determining a drag area coefficient and a coefficient of rolling resistance for the vehicle using the force-based analysis method, wherein the set of measurements includes a direct measurement of proper acceleration of the vehicle from an accelerometer on the mobile device; and determining, by the mobile application, the drag area coefficient and the coefficient of rolling resistance based on the set of measurements using the force-based analysis method.

2. The method of claim 1, further comprising:
obtaining, by the mobile application, a local air density and wind speed from a remote weather database; and
determining an air speed based on the wind speed and a ground speed.

3. The method of claim 2, wherein the ground speed is measured from a speed sensor mounted to the vehicle and in communication with the mobile device.

4. The method of claim 2, wherein the ground speed is determined based on a plurality of time-stamped location measurements from a global positioning system (GPS) sensor on the mobile device.

5. The method of claim 1, wherein the test protocol is a coast-down test protocol, and wherein the set of measurements is obtained using only sensors present on the mobile device.

6. The method of claim 1, wherein the set of measurements further include a power of propulsion of the vehicle measured from a power sensor on the vehicle and in communication with the mobile device.

7. The method of claim 1, wherein the set of measurements is recorded on a periodic basis, the method further comprising:
calculating, by the mobile application, for each of the set of measurements recorded, an (x, y) value pair based on the corresponding set of measurements to produce a plurality of (x, y) value pairs;
determining, by the mobile application, a line fit for the plurality of (x, y) value pairs; and
determining, by the mobile application, a slope and y-intercept of the line fit, wherein the coefficient of rolling resistance is the y-intercept of the line fit and the drag area coefficient is determined based on the slope.

8. The method of claim 7, wherein each of the plurality of (x, y) value pairs is calculated by:

$$y = \frac{\left(\frac{P_{propel}}{v_g} + ma_{0,\parallel} - \frac{I}{R^2}a_\parallel\right)}{ma_{0,\perp}} \text{ and } x = v_{air}^2/a_{0,\perp},$$

where $P_{propel}$ is a power of propulsion of the vehicle, $v_g$ is a ground speed, m is a mass of the vehicle, $a_{0,\parallel}$ is a component of the proper acceleration in a direction parallel to a surface upon which the vehicle travels, $a_{0,\perp}$ is a component of the proper acceleration in a direction perpendicular to the surface upon which the vehicle travels, $a_\parallel$ is acceleration in a direction of motion, I is a net moment of inertia of tires on the vehicle, R is an average radius of the tires on the vehicle, and $v_{air}$ is an air speed relative to the vehicle.

9. The method of claim 7, wherein the line fit is determined by one of the group of statistical analysis methods consisting of: linear regression, multilinear regression, multivariable regression, Bayesian inference, digital filtering, and Kalman filtering.

10. The method of claim 1, wherein the force-based analysis method comprises:

$$\frac{1}{2}\rho CdAv^2 + C_{rr}ma_{0,\perp} = F_{resist} = \frac{P_{propel}}{v_a} + ma_{0,\parallel} - \frac{1}{R^2}a_\parallel,$$

where $\rho$ is air density, CdA is the drag area coefficient, $C_{rr}$ is the coefficient of rolling resistance, m is a mass of the vehicle, $v_{air}$ is an air speed relative to the vehicle, $a_{0,\perp}$ is a component of the proper acceleration in a direction perpendicular to a surface upon which the vehicle travels, $F_{resist}$ is a net resistive force, $P_{propel}$ is a power of propulsion of the vehicle, $v_g$ is a ground speed of the vehicle, in is a mass of the vehicle, $a_{0,\parallel}$ is a component of the proper acceleration in a direction parallel to the surface upon which the vehicle travels, $a_\parallel$ is an acceleration in a direction of motion, I is a net moment of inertia of tires on the vehicle, and R is an average radius of the tires on the vehicle.

11. The method of claim 1, further comprising:
calculating, by the mobile application, a power of propulsion of the vehicle using the drag area coefficient and the coefficient of rolling resistance; and
displaying, by the mobile application, the power of propulsion on a user interface of the mobile device.

12. A method of determining resistive coefficients of a vehicle using a work-energy analysis method, the method comprising:
receiving, via a mobile application executing on a mobile device mounted to a vehicle, an input to initiate a test protocol along a path;
recording, by the mobile application, a set of measurements for determining a drag area coefficient and a coefficient of rolling resistance for the vehicle using the work-energy analysis method, wherein a power of propulsion of the vehicle is measured from a power sensor on the vehicle and in communication with the mobile device and
determining, by the mobile application, the drag area coefficient and the coefficient of rolling resistance based on the set of measurements using the work-energy analysis method.

13. The method of claim 12, wherein a normal force on the vehicle is determined from a direct measurement of proper acceleration from an accelerometer on the mobile device.

14. The method of claim 12, wherein the set of measurements includes a ground speed, an air speed, and an elevation of the vehicle.

15. The method of claim 14, further comprising:
obtaining, by the mobile application, the local air density and wind velocity from a remote weather database; and
determining the air speed based on the wind velocity and the ground speed.

16. The method of claim 14, wherein the ground speed is measured from a speed sensor mounted to the vehicle and in communication with the mobile device.

17. The method of claim 14, wherein the ground speed is determined based on a plurality of time-stamped location measurements from a global positioning system (GPS) sensor on the mobile device.

18. The method of claim 12, wherein the set of measurements is recorded on a periodic basis, the method further comprising:
calculating, by the mobile application, for each of the set of measurements recorded, an (x, y) value pair based on the corresponding set of measurements to produce a plurality of (x, y) value pairs;
determining, by the mobile application, a line fit for the plurality of (x, y) value pairs; and
determining, by the mobile application, a slope and y-intercept of the line fit, wherein the coefficient of rolling resistance is the y-intercept of the line fit and the drag area coefficient is determined based on the slope.

19. The method of claim 18, wherein each of the plurality of (x, y) value pairs is calculated by:

$$y = \left(W_{pedaling} - \frac{1}{2}\left(m + \frac{I}{R^2}\right)\left(v_f^2 - v_i^2\right) - \mathrm{mg}(h_f - h_i) - W_{other}\right)/(mI_t) \text{ and } x = \frac{I_a}{I_t},$$

where $I_a = \int v_{air}^2 v \, dt = \int v_{air}^2 ds, I_t = \int a_{0,\perp} v \, dt = \int a_{0,\perp} ds$, and $W_{pedaling} = \int P_{propel} dt$, where $P_{propel}$ is the power of propulsion of the vehicle, $v_{air}$ is an air speed, $a_{0,\perp}$ is a component of proper acceleration in a direction perpendicular to the surface upon which the vehicle travels, $v$ is a speed of the vehicle along the ground, $v_i$ is a ground speed upon initiation of a test protocol segment, $v_f$ is a ground speed upon conclusion of the test protocol segment, in is a mass of the vehicle, $h_i$ is the height upon initiation of the test protocol segment, $h_f$ is the height upon conclusion of the test protocol segment, I is a net moment of inertia of tires on the vehicle, R is an average radius of the tires on the vehicle, g is acceleration of gravity, and $W_{other}$ is work done by other dissipative forces on the vehicle.

20. The method of claim 12, wherein the work-energy analysis method comprises:

$$\frac{1}{2}\rho CdAI_a + Crr \, mI_t + W_{other} =$$

$$W_{pedaling} - \frac{1}{2}\left(m + I/R^2\right)\left(v_f^2 - v_i^2\right) - \mathrm{mg}(h_f - h_i),$$

where
$I_a = \int v_{air}^2 v \, dt = \int v_{air}^2 ds, I_t = \int a_{0,\perp} v \, dt = \int a_{0,\perp} ds$, and $W_{pedaling} = \int P_{propel} dt$, where $\rho$ is air density, CdA is a drag area coefficient, $C_{rr}$ is a coefficient of rolling resistance, where $P_{propel}$ is the power of propulsion of the vehicle, $v_{air}$ is an air speed, $a_{0,\perp}$ is a component of proper acceleration in a direction perpendicular to the surface upon which the vehicle travels, $v$ is a speed of the vehicle along the ground, $v_i$ is a ground speed upon initiation of a test protocol segment, $v_f$ is a ground speed upon conclusion of the test protocol segment, m is a mass of the vehicle, $h_i$ is the height upon initiation of the test protocol segment, $h_f$ is the height upon conclusion of the test protocol segment, I is a net moment of inertia of tires on the vehicle, R is an average radius of the tires on the vehicle, g is acceleration of gravity, and $W_{other}$ is work done by other dissipative forces on the vehicle.

\* \* \* \* \*